United States Patent
Otsuka

(10) Patent No.: US 11,789,714 B2
(45) Date of Patent: Oct. 17, 2023

(54) DATA PROCESSING SYSTEM, DATA TRANSFER DEVICE, AND CONTEXT SWITCHING METHOD

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/795,043

(22) PCT Filed: Jan. 27, 2021

(86) PCT No.: PCT/JP2021/002880
§ 371 (c)(1),
(2) Date: Jul. 25, 2022

(87) PCT Pub. No.: WO2021/157448
PCT Pub. Date: Aug. 12, 2021

(65) Prior Publication Data
US 2023/0090585 A1 Mar. 23, 2023

(30) Foreign Application Priority Data

Feb. 3, 2020 (JP) ................. 2020-016144

(51) Int. Cl.
*G06F 9/48* (2006.01)
*G06F 9/50* (2006.01)
(Continued)

(52) U.S. Cl.
CPC ............ *G06F 8/61* (2013.01); *G06F 9/48* (2013.01); *G06F 9/3009* (2013.01);
(Continued)

(58) Field of Classification Search
CPC .......... G06F 8/61; G06F 9/48; G06F 9/30116; G06F 9/3012; G06F 9/30036;
(Continued)

(56) References Cited

U.S. PATENT DOCUMENTS

| 5,530,873 | A | | 6/1996 | Takano |
| 5,896,141 | A | * | 4/1999 | Blaho ...................... G06F 9/52 |
| | | | | 345/541 |

(Continued)

FOREIGN PATENT DOCUMENTS

| JP | 06180653 A | 6/1994 |
| JP | 06083614 B2 | 10/1994 |

(Continued)

OTHER PUBLICATIONS

David Wentzlaff et al., On-Chip Interconnection Architecture of the Tile Processor, Nov. 12, 2007, [Retrieved on Jun. 30, 2023]. Retrieved from the internet: <URL: https://ieeexplore.ieee.org/stamp/stamp.jsp?tp=&arnumber=4378780> 17 Pages (15-31) (Year: 2007).*

(Continued)

*Primary Examiner* — Anibal Rivera
(74) *Attorney, Agent, or Firm* — Matthew B. Dernier, Esq.

(57) ABSTRACT

A processing section executes processes concerning a plurality of applications in a time division manner. A Context Switching Direct Memory Access (CSDMA) engine detects a switching timing of an application to be executed in the processing section. When detecting the switching timing, the CSDMA engine saves a context of an application that is being executed in the processing section 46, to a main memory from the processing section, and installs a context of an application to be subsequently executed in the processing section, from the main memory to the processing section, not through a process by software managing the plurality of applications.

13 Claims, 16 Drawing Sheets

(51) Int. Cl.
  *G06F 9/30* (2018.01)
  *G06F 8/61* (2018.01)
  *G06F 9/46* (2006.01)
  *G06F 9/38* (2018.01)

(52) U.S. Cl.
  CPC ........ *G06F 9/3012* (2013.01); *G06F 9/30036* (2013.01); *G06F 9/30101* (2013.01); *G06F 9/30116* (2013.01); *G06F 9/30123* (2013.01); *G06F 9/30141* (2013.01); *G06F 9/30145* (2013.01); *G06F 9/3867* (2013.01); *G06F 9/3885* (2013.01); *G06F 9/461* (2013.01)

(58) Field of Classification Search
  CPC ............. G06F 9/30101; G06F 9/30123; G06F 9/3885; G06F 9/461; G06F 9/3009; G06F 9/30141; G06F 9/30145; G06F 9/3867
  See application file for complete search history.

(56) References Cited

U.S. PATENT DOCUMENTS

| | | | |
|---|---|---|---|
| 7,117,319 | B2 | 10/2006 | Arimilli |
| 7,308,565 | B2 | 12/2007 | Bystricky |
| 7,386,707 | B2 | 6/2008 | Kurata |
| 2003/0149864 | A1 | 8/2003 | Furukawa |
| 2004/0111572 | A1 | 6/2004 | Arimilli |
| 2006/0288299 | A1 | 12/2006 | Bystricky |
| 2009/0228682 | A1* | 9/2009 | Mejdrich ............ G06F 9/30036 712/7 |
| 2012/0092351 | A1* | 4/2012 | Barnes .................... G06F 9/485 345/505 |
| 2014/0056577 | A1* | 2/2014 | Ogawa ............... G11B 20/1251 386/355 |
| 2015/0317161 | A1* | 11/2015 | Murphy .................. G06F 9/461 712/228 |
| 2016/0210167 | A1* | 7/2016 | Bolic ................. G06F 9/45558 |
| 2017/0262731 | A1* | 9/2017 | Uetani ................... G06V 10/96 |
| 2021/0097641 | A1* | 4/2021 | Iyer ....................... G06F 9/5072 |

FOREIGN PATENT DOCUMENTS

| | | |
|---|---|---|
| JP | 2003271399 A | 9/2003 |
| JP | 2004185602 A | 7/2004 |
| JP | 2006351013 A | 12/2006 |

OTHER PUBLICATIONS

International Search Report for corresponding PCT Application No. PCT/JP2021/002880, 4 pages, dated Apr. 27, 2021.

* cited by examiner

FIG. 15
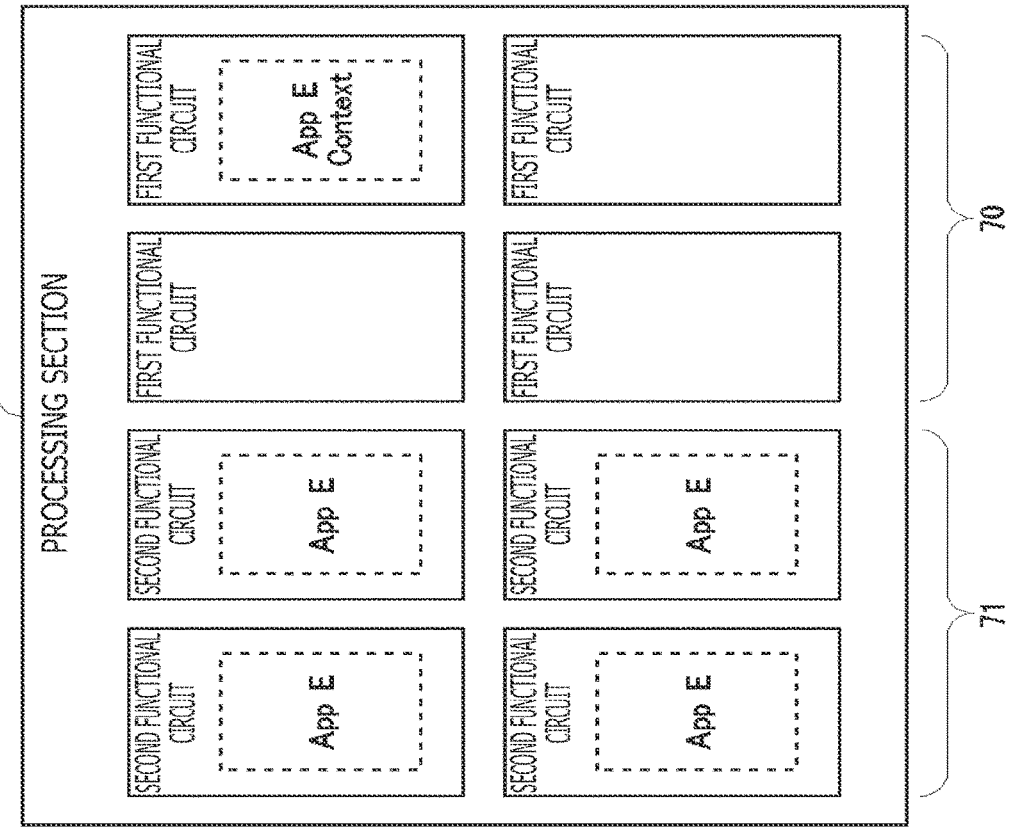
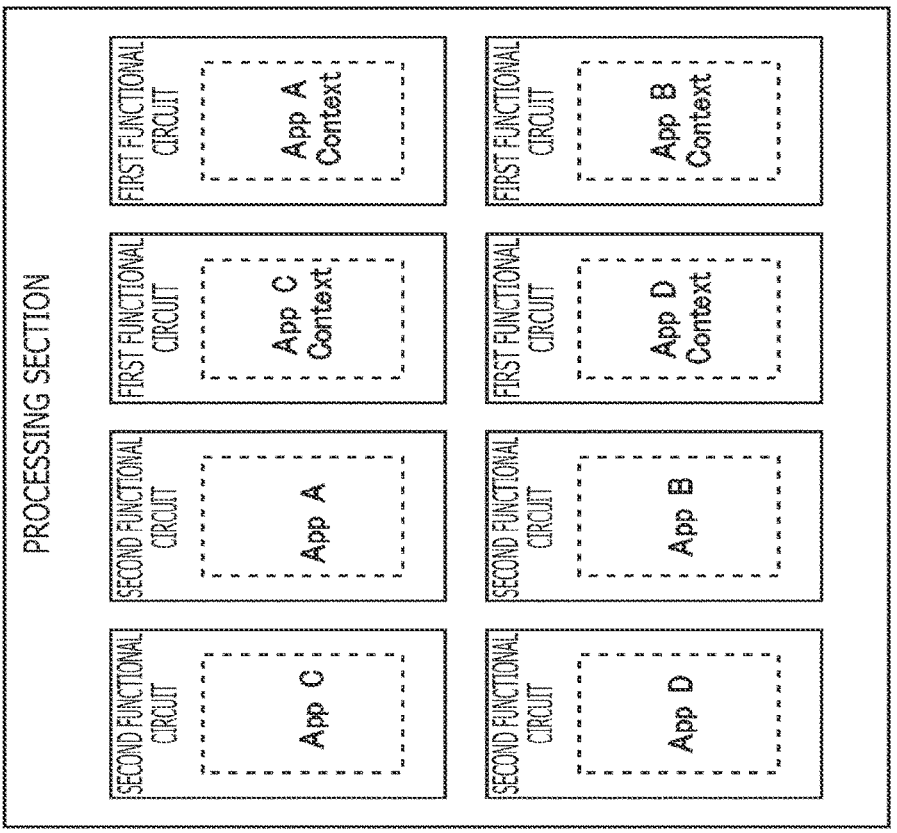

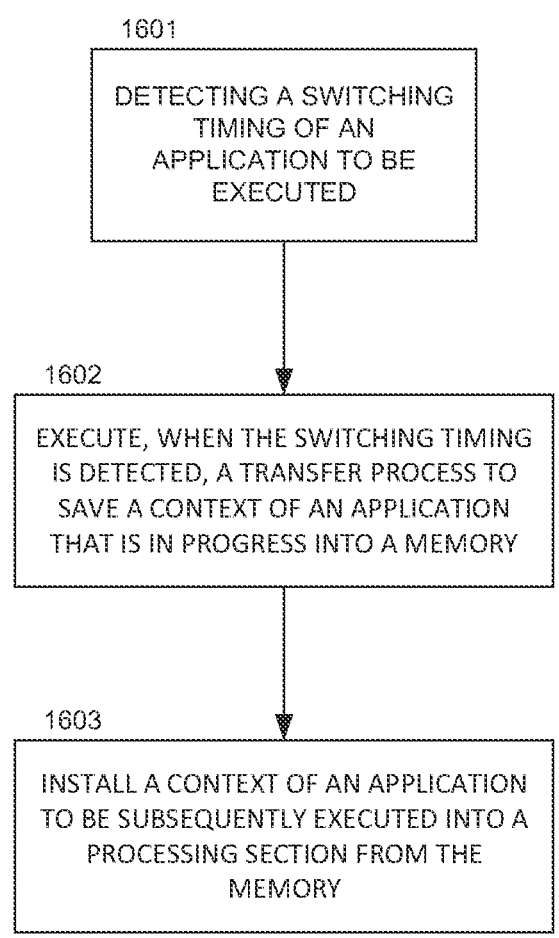

DATA PROCESSING SYSTEM, DATA TRANSFER DEVICE, AND CONTEXT SWITCHING METHOD

CROSS REFERENCE TO RELATED APPLICATIONS

This application is a National Phase application that claims priority to International Application No.: PCT/JP2021/002880, filed Jan. 27, 2021; which claims priority to Japanese Application No.: JP 2020-016144, filed Feb. 3, 2020, the entire disclosures of which are hereby incorporated by reference.

TECHNICAL FIELD

The present disclosure relates to a data processing technology, and more specifically, relates to a data processing system, a data transfer device, and a context switching method.

BACKGROUND ART

A processing section that executes processes concerning a plurality of applications in a time division manner has to execute context switching when changing an application to be executed.

SUMMARY

Technical Problem

In recent years, there has been a processing section (e.g., a GPU (Graphics Processing Unit)) equipped with several thousands or more registers. In addition, contexts of some applications that are executed by such a processing section have the size of several tens MB (Megabyte) or larger. In this case, a long period of time is likely to be required for the processing section to execute context switching.

The present disclosure has been achieved in view of the above circumstance, and one object thereof is to suppress a processing delay accompanied by context switching.

Solution to Problem

In order to solve the abovementioned problem, a data processing system according to a certain aspect of the present invention includes a processing section that executes processes concerning a plurality of applications in a time division manner, and a data transfer section that executes a data transfer between the processing section and a memory. The data transfer section includes a detection section that detects a switching timing of an application to be executed in the processing section, and a transfer executing section that executes, when the switching timing is detected, a transfer process to save a context of an application that is in progress in the processing section into the memory from the processing section, and to install a context of an application to be subsequently executed in the processing section into the processing section from the memory, not through a process by software managing the plurality of applications.

Another aspect of the present invention is a data transfer device. This device includes a detection section that detects a switching timing of an application to be executed in a processing section that executes processes concerning a plurality of applications in a time division manner, and a transfer executing section that executes, when the switching timing is detected, a transfer process to save a context of an application that is in progress in the processing section into a memory from the processing section, and to install a context of an application to be subsequently executed in the processing section into the processing section from the memory, not through a process by software managing the plurality of applications.

A still another aspect of the present invention is a context switching method. This method includes, by a computer, a step of detecting a switching timing of an application to be executed in a processing section that executes processes concerning a plurality of applications in a time division manner, and a step of executing, when the switching timing is detected, a transfer process to save a context of an application that is in progress in the processing section into a memory from the processing section, and to install a context of an application to be subsequently executed in the processing section into the processing section from the memory, not through a process by software managing the plurality of applications.

It is to be noted that any combination of the abovementioned constituent elements, and an aspect obtained by translating any one of the expressions in the present disclosure to a computer program or a recording medium having a computer program recorded therein, also take effect as aspects of the present disclosure.

Advantageous Effects of Invention

According to the present disclosure, a processing delay accompanied by context switching can be suppressed.

BRIEF DESCRIPTION OF DRAWINGS

FIGS. 15A and 15B are diagrams each illustrating an application allocation example.
FIG. 16 is a flow diagram illustrating a context switching method that may be carried out by a computing apparatus.

DESCRIPTION OF EMBODIMENTS

Figure 1:
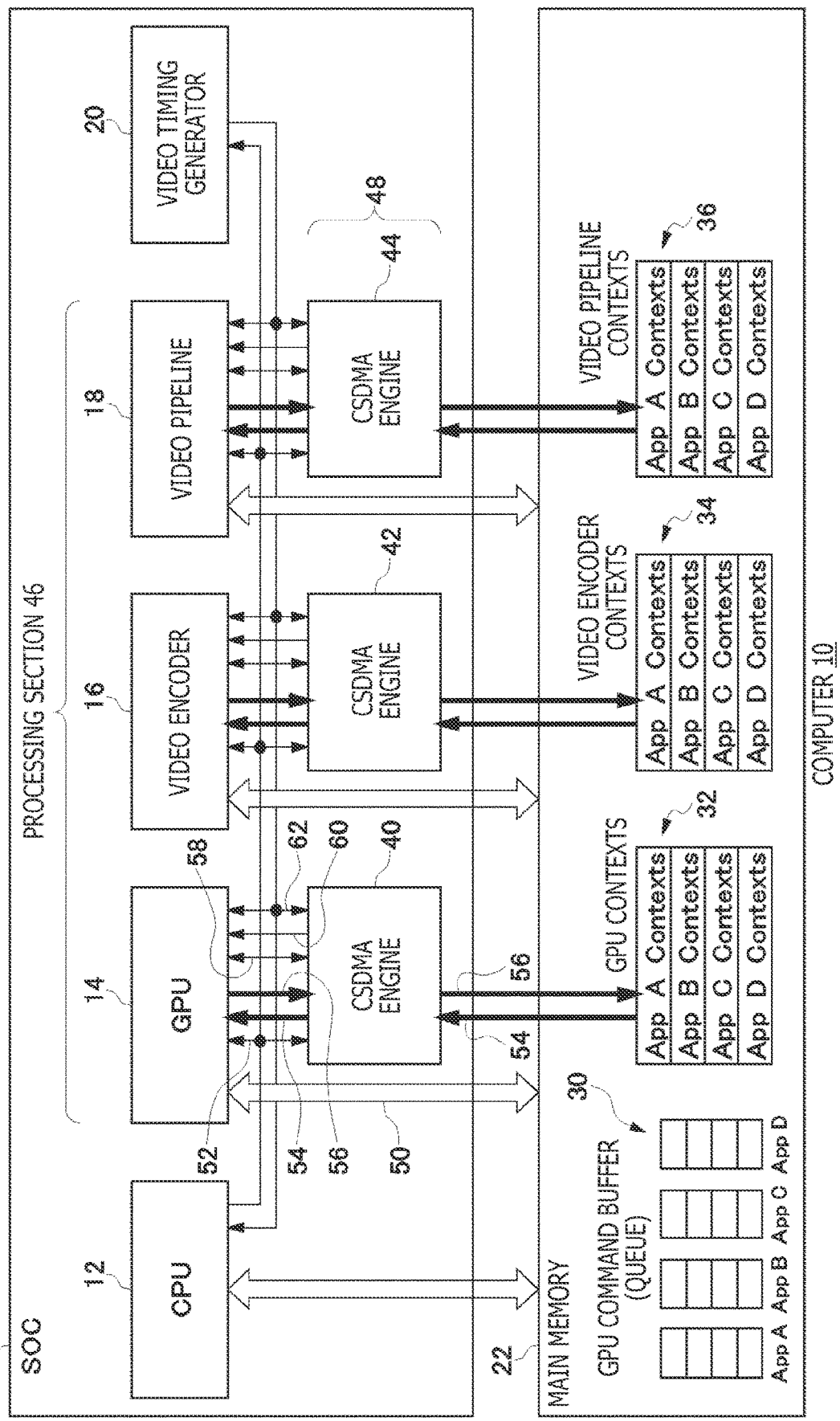
FIG. 1 is a diagram illustrating a configuration of a computer according to a first embodiment.

Each embodiment provides a processing section that executes processes concerning a plurality of applications in a time division manner, that is, provides a technology of executing context switching at high speed in a processing section that is shared by a plurality of applications in a time division manner. The technology according to the embodiments is effective for operation of a certain system of coming to a temporary halt such as a suspension or hibernation while holding the current state, and then, restarting execution from the held state. The speed of the operation can be increased.

The processing section may be a hardware functional block disposed on an SOC or the like. Further, the processing section may be (1) a processor such as a CPU (Central Processing Unit), a DSP (Digital Signal Processor), a GPU, or an NPU (Network Processing Unit), or may be (2) a video codec block that compresses or decompresses a video. Hereinafter, a video codec block that compresses a video is also referred to as a "video encoder." Alternatively, the processing section may be (3) a video (display) pipeline block (hereinafter, also referred to as a "video pipeline") that executes resolution conversion, image quality conversion, multiplexing, etc., of a video and that processes pixel data at a prescribed timing, or may be (4) an input/output interface block to a peripheral device.

BACKGROUND

There is a case where one hardware functional block (referred to as a "processing section" in the embodiments) executes a plurality of application task threads (hereinafter, referred to as "applications") in a time division manner. In order to execute a unique process for each of the applications, the processing section holds data for designating an application to be executed, data for designating installation and operation, and other data. The processing section sets up the data before starting the process. When executing a process concerning an application, the processing section generates data, setting, an operation state, etc., unique to the application, as appropriate. Hereinafter, a data set that is required for a process concerning each application, and a data set that is generated in the process, are each referred to as a "context." That is, a context refers to a necessary data set to ensure reproducibility for obtaining a consistent result when the same process is executed by the same processing section again.

In a case where one processing section executes a plurality of applications in a time division manner, a switching process in the processing section is required. Specifically, a context of an application that is in progress in the processing section is saved into the outside, and a context of an application to be subsequently executed is installed into the processing section, whereby time-divisional application switching is implemented. Hereinafter, this switching is referred to as "context switching." During saving and installation of a context, processing in the processing section needs to be suspended. In order to increase the use efficiency of the processing section and reduce a processing delay in the processing section (in other words, increase the real-time property), increase in the speed of context switching and reduction in the process suspending time period in the processing section are desired.

In general, in context switching, software makes access to a processing section, and saving and installation of contexts are executed through sequential processes by the software via a register access. Meanwhile, as a result of recent improvement of functions of processing sections, the number of registers for installation can become several thousands or more, and further, a data amount of contexts held during a process can reach several tens of MB or more. For this reason, a time of several tens of milliseconds order, for example, is required to execute context switching through sequential processing by software, so that the real-time property may seriously be impaired.

Some CPUs have a hardware function for supporting increase in the speed of context switching. However, with this function, hardware merely automatically saves and installs contexts through only a few registers accessible to software. Thus, saving and installation of all the contexts held in a CPU are not performed. For this reason, the remaining contexts are saved and installed through sequential processing by software. This applies to a case where a general x86 or ARM architecture CPU executes an OS (e.g., Windows (registered trademark), Linux (registered trademark)) and a plurality of applications, for example.

Outline of Embodiment

A data processing system according to an embodiment includes a dedicated functional block that executes a context transfer for context switching in a processing section. Accordingly, even for a combination of an application and a processing section using enormous contexts, context switching is executed at high speed. In other words, a processing delay accompanied by the context switching is suppressed. Hereinafter, the dedicated functional block is referred to as a "context switching DMA (Direct Memory Access) engine," and is abbreviated as "CSDMA engine."

When receiving a report on an application switching timing or detecting an application switching timing by itself, the CSDMA engine (1) makes a selection from among contexts of applications held in a memory, and transfers and installs the selected context into the processing section, not through software. Alternatively, the CSDMA engine (2) transfers and saves a context held in the processing section into the memory, not through software.

Targets to be transferred for context switching include the details of a register, the details of the memory in the processing section, a status state (an inner state of a state transition) of a state machine, and the current state of an outstanding process that is being executed on the fly. These targets are not necessarily accessible to the software, and may be included in the processing section and hold contexts. That is, targets to be transferred for context switching according to the embodiment include a context that is normally inaccessible to the software.

When receiving a report on an application switching timing or detecting an application switching timing by itself, the CSDMA engine may issue an operation stop command to the processing section. Further, upon confirming completion of a process that is being executed on the fly, or particularly, completion of a process that requires an outstanding or out-of-order commitment, the CSDMA engine may start saving and installing contexts. The CSDMA engine may provide an instruction to start a process of a next application after the saving and installation of contexts are completed. This series of processing is not necessarily executed by the CSDMA engine, and may be executed cooperatively by the CSDMA engine and the processing section holding the latest context.

The processing section may be provided with a plurality of queues for a plurality of applications. Data indicating an instruction to the processing section may be written into the queues from the corresponding applications, as needed. When context switching occurs, the processing section may change a queue from which data is read. In addition, a timing for writing data into a queue corresponding to a certain application is not limited to a point within a time period during which the application is occupying the processing section. Thus, while context switching is in progress, process instructions of the respective applications can be accumulated in the corresponding queues, so that a process suspending time period accompanied by the context switching can be shortened. Moreover, even a case where software in the CPU that writes data into the queues operates asynchronously with the processing section (e.g., a GPU) can be handled.

In response to the start of a vertical blanking interval or a horizontal blanking interval, the CSDMA engine may execute context switching. In a video processing system, for example, a GPU, a video pipeline, a video encoder, etc., can temporarily be stopped for a vertical blanking interval and a horizontal blanking interval. Thus, when context switching is executed during a vertical blanking interval or horizontal blanking interval which is short, overhead in the context switching can be concealed.

When a context is saved from the processing section and when a context is installed into the processing section, a scan chain for DFT (Design For Test) or a memory BIST (Built-In Self-Test) may be used as a path. As a result, a line connecting the processing section and the memory via the CSDMA engine does not pass through an in-chip bus (fabric) which is used for normal data transfer, whereby normal data transfer is not inhibited. In addition, it is not necessary to provide any dedicated interface for context switching. Moreover, in the processing section, a DFT circuit is connected to a circuit holding context information, and thus, the necessity of using any line for normal data transfer or a dedicated line can be eliminated.

Among the functional blocks in the processing section, only a functional block (e.g., a circuit) holding contexts may partially or entirely be multiplexed. In this case, context switching may be executed by the following steps. (1) A context is previously installed into a separate one of the multiplexed circuits without involving a temporary halt of the processing section. (2) A process in the processing section is stopped (a commitment to the previous process may be waited), the circuit in which the context has been installed at (1) is selected, and execution of the next application is started. (3) A context of the application in progress at (1) is saved. Accordingly, a context switching process and a process in the processing section can be time-overlapped, so that the process suspending time period can further be shortened.

In addition, among the functional blocks of the processing section, a circuit holding contexts may be multiplexed, and further, the processing section may start a process of the next application without involving a temporary halt for waiting for a commitment. However, it may be determined whether or not a process failure occurs due to the difference in application settings (for example, the same circuit may be operated on the basis of different settings) between an application that is executed before context switching and an application that is executed after the context switching, and a temporary halt may continue until a commitment is completed, if needed. Further, while some of the functional circuits are parallelized to avoid a process failure, a plurality of applications may simultaneously be executed. Accordingly, processes of a plurality of applications (or outstanding or out-of-order processes) can parallelly be executed, whereby the suspending time period due to context switching can be shortened. In addition, the circuit utilization efficiency, the performance scalability, and the flexibility can be enhanced.

First Embodiment

FIG. 1 illustrates a configuration of a computer 10 according to a first embodiment. The computer 10 may be a server that parallelly processes a plurality of applications (e.g., games) according to requests from a plurality of client devices and that provides respective processing results (e.g., image data) of the applications to the clients devices. Alternatively, the computer 10 may be a PC (Personal Computer) or a game machine (e.g., a video game console) that parallelly executes a plurality of applications in a time division manner and that displays respective processing results (e.g., image data) of the applications on a display device.

The computer 10 includes an SOC 11 and a main memory 22. The SOC 11 is an integrated circuit product formed by implementing functions of a data processing system on a single chip. The SOC 11 includes a CPU 12, a GPU 14, a video encoder 16, a video pipeline 18, and a video timing generator 20.

The CPU 12 executes a plurality of applications to be parallelly executed in a time division manner. Further, the CPU 12 executes software (hereinafter, also referred to as "management software") managing a plurality of applications to be parallelly executed. The management software may be software such as an OS or middleware that is set on a layer below the applications. In the embodiment, the management software manages the execution order of the applications and manages context switching. It is to be noted that the functions of the management software may partially be executed by the GPU 14, the video encoder 16, or the like (a processing section 46 which will be described later).

The GPU 14 executes image processing and general-purpose computing concerning a plurality of applications in a time division manner according to commands of the plurality of applications that are executed by the CPU 12 in a time division manner. For example, the GPU 14 generates image data of each application and writes the generated image data into a frame buffer corresponding to the application.

The video encoder 16 compresses images of a plurality of applications to be parallelly processed, in a time division manner. For example, the video encoder 16 sequentially reads out image data of the respective applications from frame buffers corresponding to the applications, and compresses and encodes the read image data.

The video pipeline 18 executes resolution conversion, image-quality conversion, and multiplexing, in a time division manner, of images supplied from another block (e.g., the GPU 14 or a not-illustrated video coder) which is an image supplier, that is, images of a plurality of applications to be parallelly processed.

There are three patterns of image exchange among the GPU 14, the video encoder 16, and the video pipeline 18, as follows.
(1) GPU 14→video pipeline 18→video encoder 16.
(2) GPU 14→video encoder 16.
(3) not-illustrated block (e.g., video decoder)→video pipeline 18→video encoder 16. However, a processing result obtained by the GPU 14 is also inputted to the video pipeline 18.

That is, there are a pattern (A) that the video encoder 16 makes reference directly to an image generated by the CPU 12, and a pattern (B) that the video encoder 16 makes reference to an image processed by the video pipeline 18.

In the abovementioned manner, the GPU 14, the video encoder 16, and the video pipeline 18 are configured to execute a plurality of applications to be parallelly processed, in a time division manner. Hereinafter, a set of the GPU 14, the video encoder 16, and the video pipeline 18 is referred to as a "processing section 46."

The video timing generator 20 reports image display-related timings (or video timings) to the sections. In the embodiment, the video timing generator 20 transmits a signal for reporting the start of a vertical blanking interval (or a time period corresponding to a vertical blanking interval) of the display device, to the CPU 12, the GPU 14, the video encoder 16, and the video pipeline 18.

In addition, the SOC 11 further includes a CSDMA engine 40, a CSDMA engine 42, and a CSDMA engine 44 (collectively referred to as a "CSDMA engine 48"). The CSDMA engine 48 is a data transfer section that executes, by DMA, a context transfer for context switching.

For context switching in the GPU 14, the CSDMA engine 40 executes a context transfer between the GPU 14 and the main memory 22. For context switching in the video encoder 16, the CSDMA engine 42 executes a context transfer between the video encoder 16 and the main memory 22. For context switching in the video pipeline 18, the CSDMA engine 44 executes a context transfer between the video pipeline 18 and the main memory 22.

A path 50 is used for normal memory accesses (including command reading and image data storing) which are made by the GPU 14. A path 52 is an access path (for installation, confirmation, reporting, and control) from software (e.g., management software) that is executed in the CPU 12, to the GPU 14 and the CSDMA engine 40. The path 52 is also connected to another block for the same purpose. It is to be noted that a black circle at an intersection between lines in FIG. 1 indicates that the lines are connected to each other, and an intersection between lines without a black circle indicates that the lines are not connected to each other. A path 54 is a context installation path from the main memory 22 to the GPU 14. A path 56 is a context saving path from the GPU 14 to the main memory 22.

A path 58 is used by the CSDMA engine 40 to monitor the processing state of the GPU 14. A path 60 is used by the CSDMA engine 40 to provide an instruction to stop and start (restart) an application process to the GPU 14. A path 62 is used by the video timing generator 20 to report the start of a vertical blanking interval to the GPU 14 and the CSDMA engine 40. The path 62 is also connected to another block for the same purpose. The same applies to the paths between the video encoder 16 and the CSDMA engine 42, and the paths between the video pipeline 18 and the CSDMA engine 44.

The main memory 22 stores data that is referred to or updated by the SOC 11. The main memory 22 stores a GPU command buffer 30, a GPU context 32, a video encoder context 34, and a video pipeline context 36.

The GPU context 32 is a context related to a plurality of applications (App A and App B, for example) that are parallelly executed in the SOC 11, and is used by the GPU 14. Likewise, the video encoder context 34 is a context related to a plurality of applications that are parallelly executed in the SOC 11, and is used by the video encoder 16. The video pipeline context 36 is a context related to a plurality of applications that are parallelly executed in the SOC 11, and is used by the video pipeline 18.

The GPU command buffer 30 includes a plurality of queues (for App A and App B, for example) corresponding to a plurality of applications that are parallelly processed in the SOC 11. Into each queue in the GPU command buffer 30, a command for designating the details of a process of the corresponding application is written and accumulated by the CPU 12. In other words, each application that is executed in the CPU 12 stores a rendering designation command or the like into the corresponding queue in the GPU command buffer 30. The GPU 14 reads out a command from a queue in the GPU command buffer 30 that corresponds to an application to be executed. When an application to be executed is changed, the GPU 14 changes a queue from which a command is to be read out.

Since the GPU command buffer 30 is provided as described above, the CPU 12 becomes able to operate asynchronously with the processing section 46 (for example, the GPU 14, the video encoder 16, and the video pipeline 18). That is, applications that are parallelly executed in the CPU 12 (in a time division manner, etc.) can store respective commands concerning the applications into the GPU command buffer 30, as needed, even while the processing section 46 is processing another application. In other words, a case where software in the CPU 12 that performs writing into the GPU command buffer 30 operates asynchronously with the processing section 46, can be handled. Accordingly, during context switching in the processing section 46, the applications on the CPU 12 can accumulate process commands in the GPU command buffer 30, so that a processing delay can be suppressed.

It is to be noted that, in the SOC 11 according to the embodiment, the management software that is executed in the CPU 12 performs initial setting of context switching. For example, the management software ensures, in the main memory 22, regions for the GPU context 32, the video encoder context 34, and the video pipeline context 36 of each of the applications to be parallelly processed. In addition, the management software reports the context storing locations (e.g., addresses) of the respective applications to the CSDMA engine 48 (the CSDMA engine 40, the CSDMA engine 42, and the CSDMA engine 44).

Further, the management software reports an order of executing a plurality of applications to be parallelly processed, to the processing section 46 and the CSDMA engine 48. The processing section 46 and the CSDMA engine 48 grasp applications to be now executed and applications to be next executed, on the basis of setting or the report made by the management software.

In a certain modification which is not illustrated in FIG. 1, the CSDMA engine 48 for context switching may also be provided in the CPU 12. In this case, the CPU 12 may operate synchronously with the processing section 46.

Figure 2:
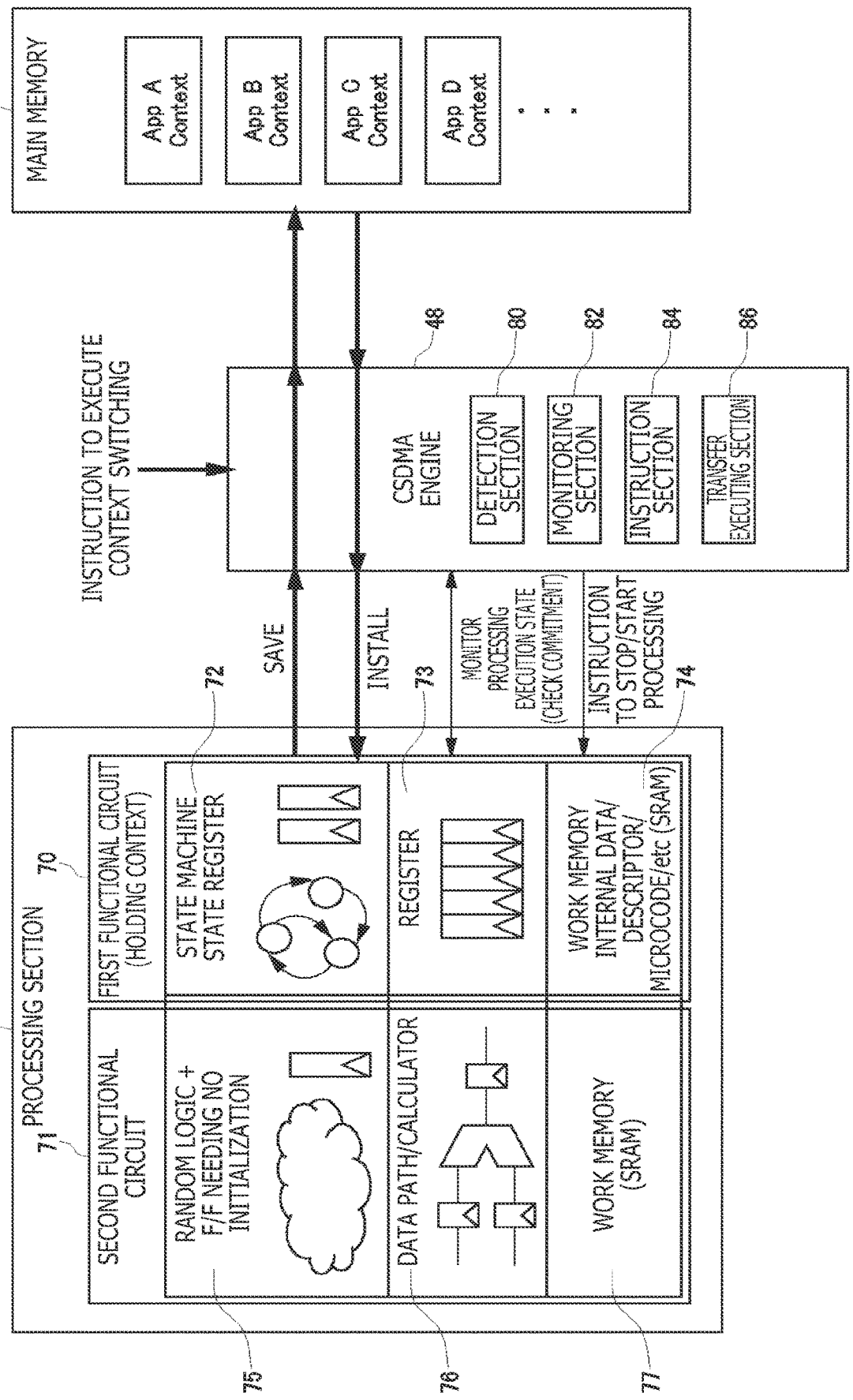
FIG. 2 is a block diagram illustrating detailed configurations of a processing section and a CSDMA engine.

FIG. 2 is a block diagram illustrating the detailed configurations of the processing section 46 (specifically, the GPU 14, the video encoder 16, and the video pipeline 18) and the CSDMA engine 48 which are illustrated in FIG. 1. A set of the processing section 46 and the CSDMA engine 48 in FIG. 2 corresponds to a set of the GPU 14 and the CSDMA engine 40 in FIG. 1, a set of the video encoder 16 and the CSDMA engine 42 in FIG. 1, and a set of the video pipeline 18 and the CSDMA engine 44 in FIG. 1. That is, the configuration of the processing section 46 in FIG. 2 is applicable to at least one of the GPU 14, the video encoder 16, and the video pipeline 18. Also, the configuration of the CSDMA engine 48 in FIG. 2 is applicable to at least one of the CSDMA engine 40, the CSDMA engine 42, and the CSDMA engine 44.

Each block illustrated in the block diagrams disclosed herein can be implemented by an element or machine unit such as a CPU or a memory of a computer in terms of hardware, and can be implemented by a computer program or the like in terms of software. In the drawings, functional blocks that are implemented by interlocking the hardware and software elements are illustrated. A person skilled in the art should understand that these functional blocks can be implemented in a variety of forms according to a hardware/software combination.

The processing section 46 includes a first functional circuit 70 and a second functional circuit 71. The first functional circuit 70 and the second functional circuit 71 execute data processing (for example, image generation, compression/decompression) of an application to be executed. The processing section 46 identifies an application to be executed, on the basis of setting or a report made by the management software in the CPU 12, and allocates the first functional circuit 70 and the second functional circuit 71 to the application to be executed.

The processing section 46 reads out, from the main memory 22, various kinds of data concerning the application to be executed, and inputs the data to the first functional circuit 70 and the second functional circuit 71. For example, the GPU 14 as the processing section 46 reads out, from a queue in the GPU command buffer 30 corresponding to the application to be executed, a command concerning the application. In addition, the GPU 14 also reads out any other data that is necessary for image rendering, from the main memory 22.

The first functional circuit 70 is a circuit holding a context which is data that is updated during execution of an application and that is necessary to reproduce a process. In addition, in the first functional circuit 70, replacement of contexts is necessary according to an application to be executed. The first functional circuit 70 includes a state machine 72, a register 73, and a work memory 74. The state machine 72 includes a state register and holds the current state of each process being executed in the processing section 46. In other words, the state machine 72 holds the status of a state transition. The register 73 holds data being installed or being processed, and a process result. The work memory 74 is a region in a memory of the processing section 46 where a descriptor and a microcode and internal data which is updated according to a process are held.

The second functional circuit 71 does not hold any context which is data that is necessary to reproduce a process and that is updated when an application is being executed. In addition, the second functional circuit 71 does not need to be initialized or can be reset by collective reset. The second functional circuit 71 performs computing, for example. The second functional circuit 71 includes a random logic 75, a calculator 76, and a work memory 77. The random logic 75 includes a hard-wired function. The random logic 75 includes a flip-flop circuit (latch) for which initialization is unnecessary or fixed initialization can be performed. The calculator 76 includes a data path and a flip-flop circuit (latch) for which initialization is unnecessary or fixed initialization can be performed. The work memory 77 is a region excluding the work memory 74 in the memory of the processing section 46.

The CSDMA engine 48 includes a detection section 80, a monitoring section 82, an instruction section 84, and a transfer executing section 86. The detection section 80 detects a switching timing (hereinafter, also referred to as an "App switch timing") of an application to be executed in the processing section 46. The detection section 80 according to the embodiment detects a start timing of a vertical blanking interval as an App switch timing. Specifically, when a start timing of a vertical blanking interval is reported by the video timing generator 20, the detection section 80 determines that it is an App switch timing.

In a certain modification, the detection section 80 may detect a start timing of a horizontal blanking interval as an App switch timing. Specifically, when a start timing of a horizontal blanking interval is reported by the video timing generator 20, the detection section 80 may determine that it is an App switch timing. In another modification, the management software in the CPU 12 may report an App switch timing to the processing section 46 and the CSDMA engine 48. The detection section 80 may detect an App switch timing on the basis of a report made by the management software in the CPU 12.

When an App switch timing is detected, the monitoring section 82 monitors the execution state of a process concerning an application in the processing section 46. The process concerning the application in the processing section 46 includes a plurality of small-granularity internal processes. The plurality of internal processes are parallelly executed. The monitoring section 82 checks the execution state of each internal process (for example, whether or not each internal process is completed).

The instruction section 84 provides an instruction to stop/start (restart) a process concerning an application, to the processing section 46. When an App switch timing is detected, the instruction section 84 may provide an instruction to stop a process concerning an application, to the processing section 46. The processing section 46 may detect an App switch timing on the basis of the instruction provided from the instruction section 84 of the CSDMA engine 48, or may detect an App switch timing on the basis of a report made by the management software in the CPU 12 or the video timing generator 20. It is to be noted that the monitoring section 82 and the instruction section 84 are optional, and that the CSDMA engine 48 may lack the monitoring section 82 and/or the instruction section 84.

When an App switch timing is detected, the transfer executing section 86 executes a context transfer process. Specifically, the transfer executing section 86 executes the context transfer process of saving a context of an application that is in progress in the processing section 46 into the main memory 22 (the context storing region of the application) from the processing section 46 (the first functional circuit 70), not through a process by the software (in the embodiment, the management software in the CPU 12) managing a plurality of applications.

In addition, in the context transfer process, the transfer executing section 86 reads out a context of an application to be subsequently executed in the processing section 46 from the main memory 22 (the context storing region of the application), not through a process by the software (the management software in the CPU 12 in the embodiment) managing a plurality of applications. The transfer executing section 86 installs the read context into the processing section 46 (first functional circuit 70). When detecting that the context installing process performed by the transfer executing section 86 is completed, the instruction section 84 may provide an instruction to start (restart) a process concerning the application, to the processing section 46.

A context to be transferred by the transfer executing section 86 is data necessary to reproduce application processes (the abovementioned internal processes) suspended due to context switching in the processing section 46. In the embodiment, targets to be transferred by the transfer executing section 86 are all the contexts held in the first functional circuit 70 of the processing section 46, and include a context inaccessible to software (e.g., the software in the CPU 12 and the software in the processing section 46). Examples of the context inaccessible to software include a context that is held in the state machine 72 of the processing section 46, and a context indicating the status of a state transition of internal processes included in the application process.

Figure 3:
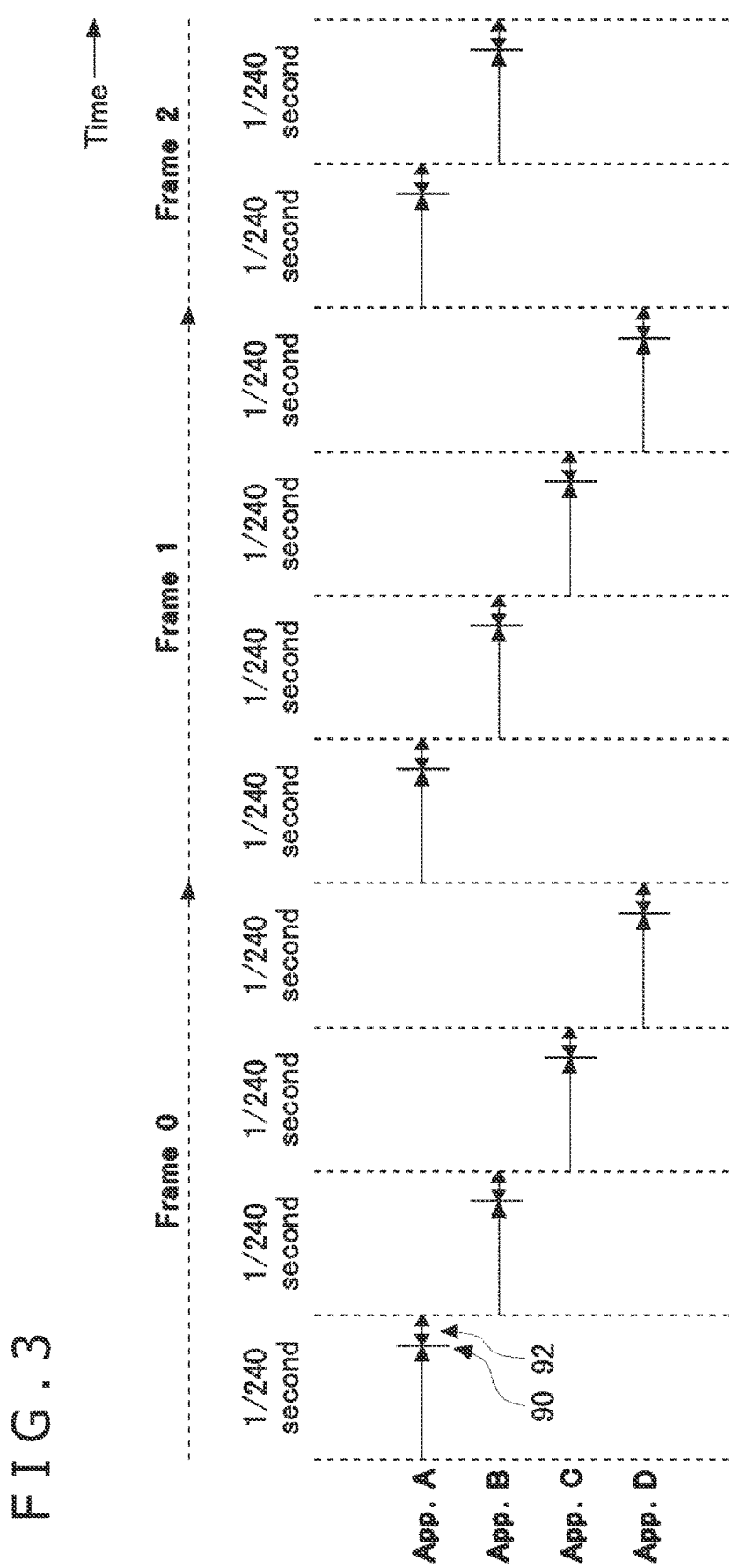
FIG. 3 is a diagram depicting video rendering processes in the processing section in time series.

FIG. 3 depicts video rendering processes in the processing section 46 (e.g., the GPU 14) in time series. FIG. 3 depicts an example in which video rendering processes concerning four applications (App A, App B, etc.) are executed in a time division manner. In the present embodiment, each application has to generate an image by 60 fps (frames per second). The processing section 46 achieves a frame rate of 60 fps per one application by generating each of images of the four applications within 1/240 second.

However, a processing time of each application constantly varies on the basis of rendered images. Not every process is completed within 1/240 second. To this end, according to the embodiment, the start timing (a timing 90 in FIG. 3) of a vertical blanking interval is detected as an App switch timing (or a flip timing of changing a frame buffer that is an image writing destination), as previously explained. Even if generation of an image is not completed yet at this timing, the processing section 46 is offered to the next application, so that the time periods during which the respective applications are able to use the processing section 46 can be equalized. It is to be noted that, if generation of an image of an application is not completed at the timing 90, a drop frame occurs. Then, the last image of the application is repeatedly used in the following process.

A time period 92 in FIG. 3 corresponds to a vertical blanking interval. When the CSDMA engine 48 is used, all contexts that are necessary to reproduce processes are saved and installed at high speed during this time period. In such a manner, control is performed to adjust the total time of an image generation time period, which is indicated by an arrow, and the time period 92 (vertical blanking interval) including context switching, to be equal to or shorter than 1/240 second.

It is to be noted, when generation of an image of an application is completed before the start timing of a vertical blanking interval, a report that the application is able to execute a flip for changing a frame buffer may be made to the management software in the CPU 12. Further, the management software in the CPU 12 may report the App switch timing, in place of the start timing of a vertical blanking interval, to the processing section 46. As a result, the start of the following process of the application and the start of the process of the next application are moved forward, whereby a delay can be reduced, and the use efficiency of the processing section can be increased.

It is to be noted that, in a certain modification, the start timing of a horizontal blanking interval may be detected as an App switch timing, and context switching may be executed during the horizontal blanking interval.

Figure 4:
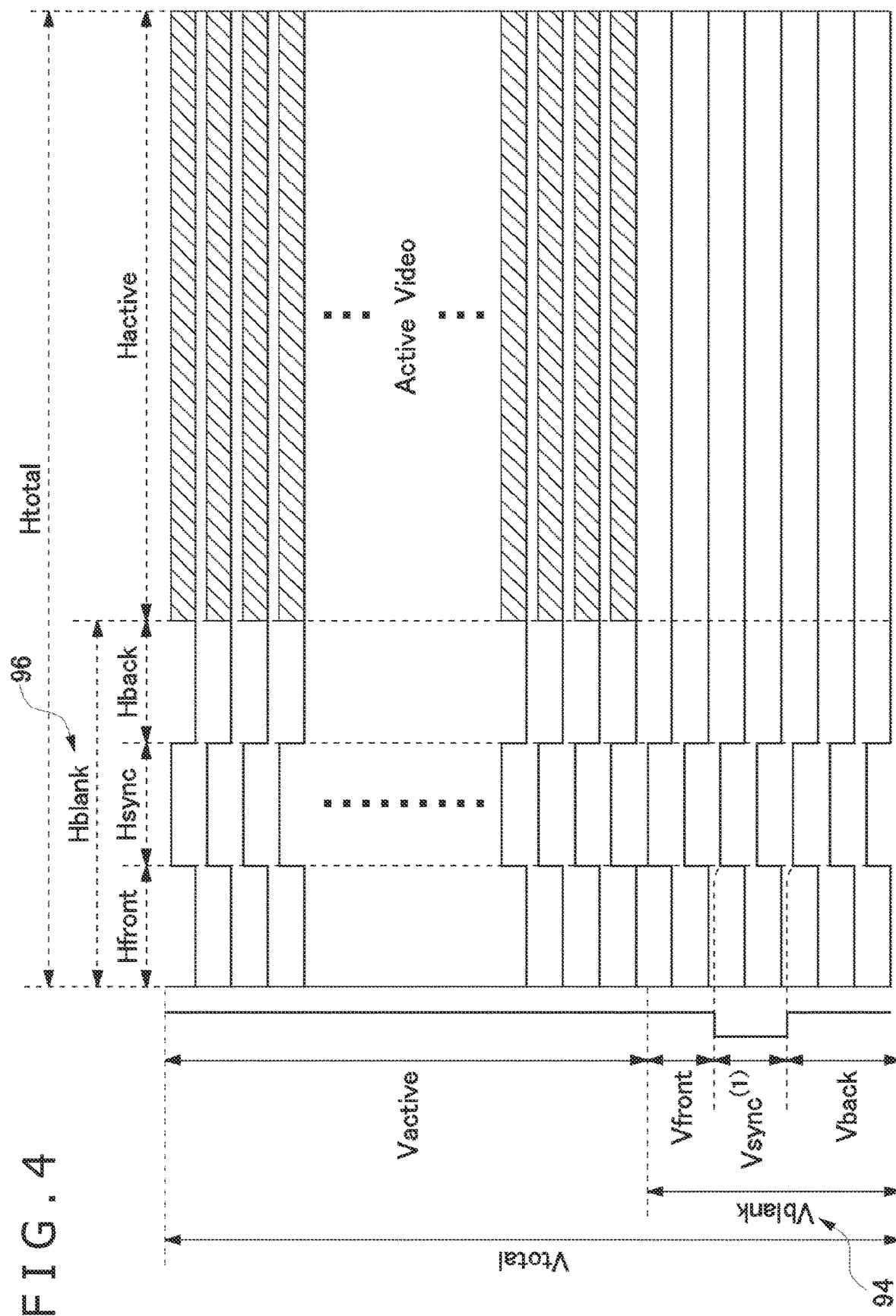
FIG. 4 is a diagram depicting an example of video timings.

FIG. 4 depicts an example of a video timing. FIG. 4 depicts a vertical blanking interval 94 (Vblank) and a horizontal blanking interval 96 (Hblank). It is to be noted that, in a case where a server renders a video and distributes the video to a client, establishment of connection between an external display using a video timing and the server may be failed. Also in this case, a video timing may be generated in order to maintain compatibility with conventional applications. In the embodiment, such a video timing is used to detect an App switch timing.

During a vertical blanking interval and a horizontal blanking interval, the GPU 14, the video encoder 16, and the video pipeline 18 may temporally stop processing. In the embodiment, context switching is executed during a vertical blanking interval or horizontal blanking interval which is short, whereby the overhead of context switching can be concealed.

Next, a context transfer path will be explained.

Figure 5:
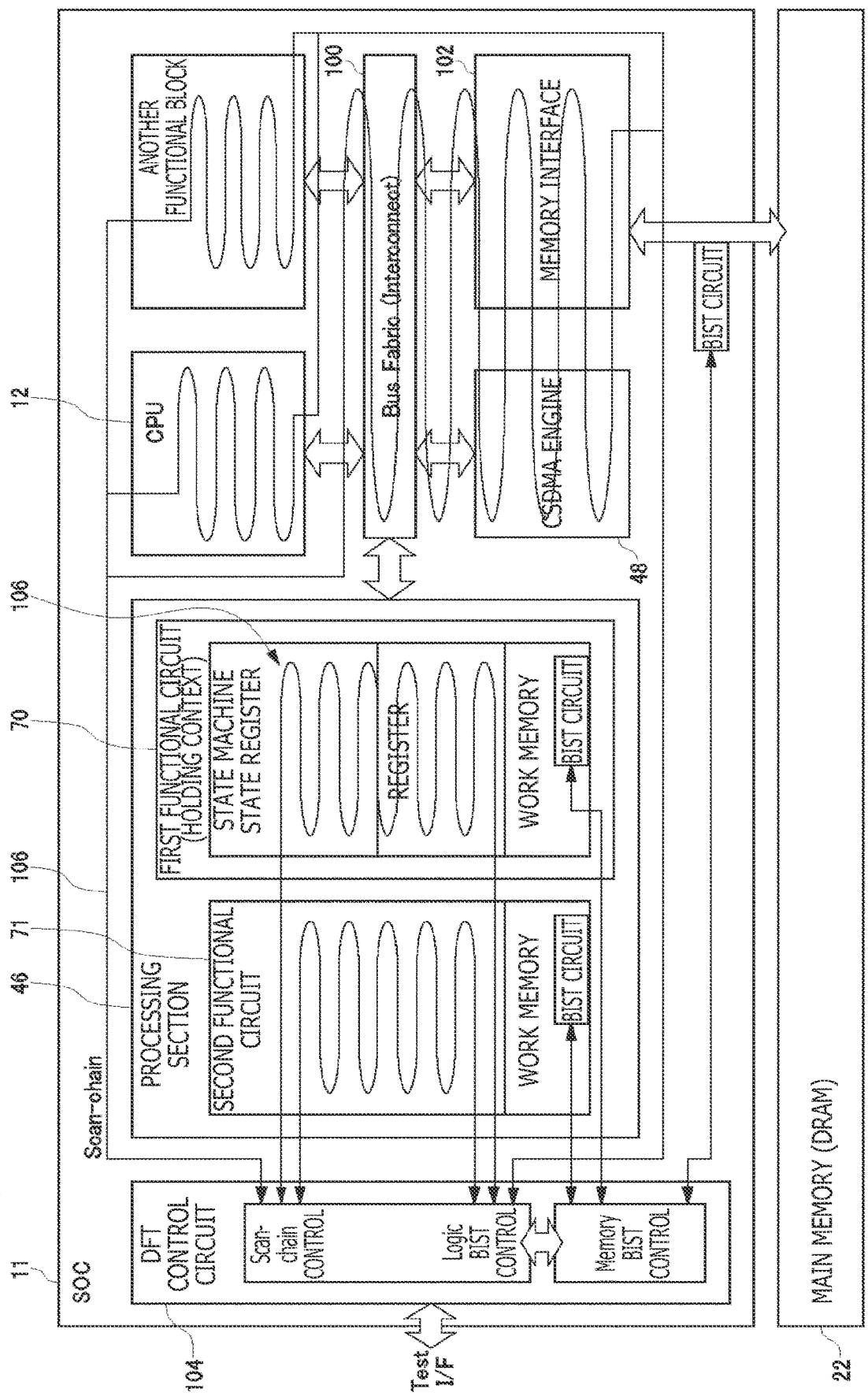
FIG. 5 is a diagram illustrating a configuration of an SOC (System-On-a-Chip).

FIG. 5 illustrates a configuration of the SOC 11. Each circuit in the SOC 11 normally makes an access to the main memory 22 via the bus fabric 100 and a memory interface 102. A DFT function (e.g., a DFT control circuit 104) for testing whether or not a function is properly operated is included in the SOC 11 (i.e., a semiconductor chip). In addition, a BIST (Built-In Self Test) has a self-diagnosis function and is equipped with a logic circuit and a memory circuit. A scan chain 106 is connected to all the circuits in the SOC 11 and is used to test the circuits on the basis of an instruction from the BIST or the outside of the chip. Since the scan chain 106 is used, the status values in the SOC 11 can be set and read out.

Figure 6:
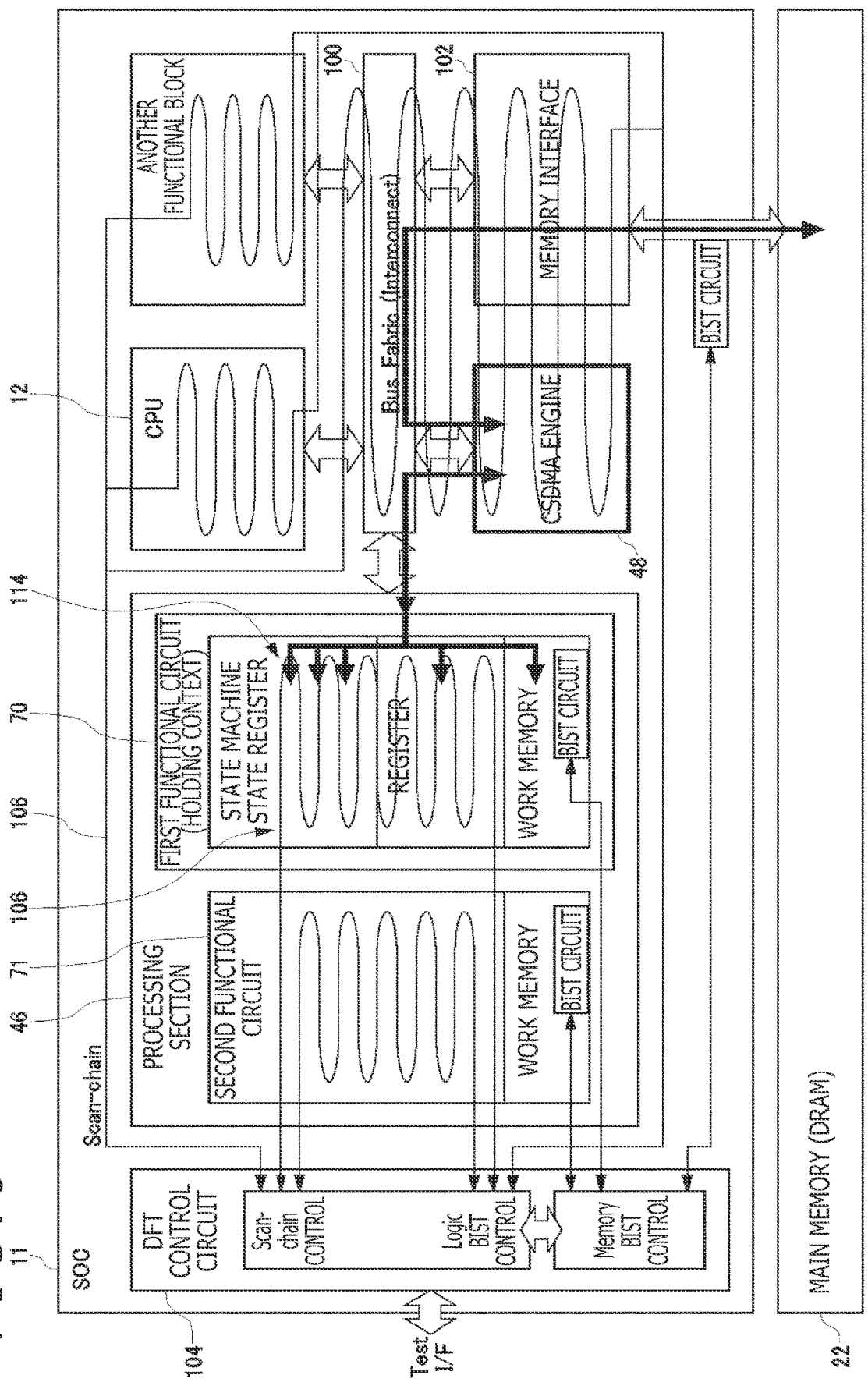
FIG. 6 is a diagram illustrating a configuration of an SOC.

FIG. 6 also illustrates a configuration of the SOC 11. As illustrated in FIG. 6, the CSDMA engine 48 can save and install contexts by using a bus (the bus fabric 100) for normal data transfer and a path 114. Through the path 114, an access to a circuit holding a context that is inaccessible to software is made. However, this configuration has a demerit that a normal data transfer is inhibited because the bus fabric 100 is shared with another circuit (e.g., the CPU 12) during a context transfer.

Figure 7:
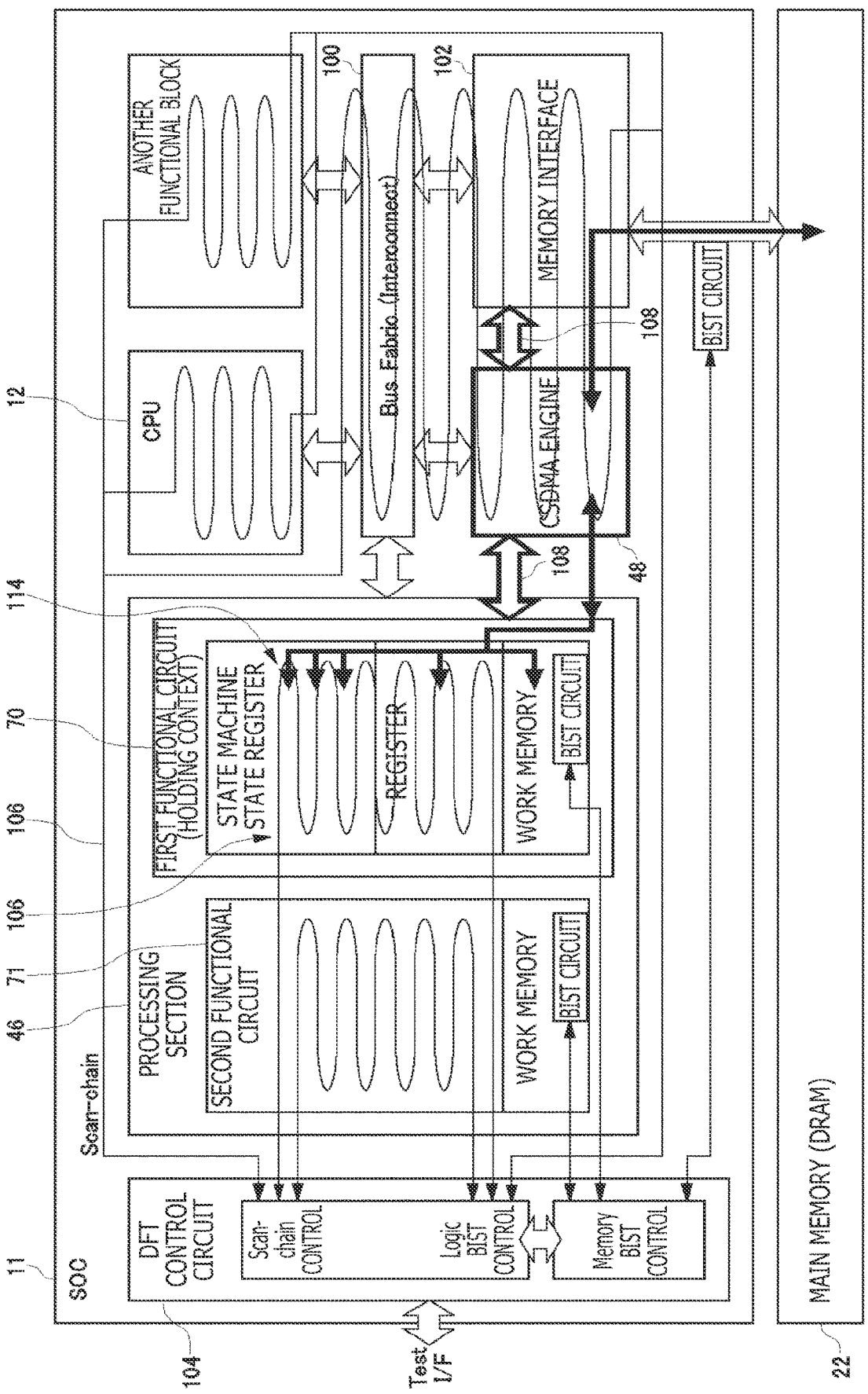
FIG. 7 is a diagram illustrating a configuration of an SOC.

FIG. 7 also illustrates a configuration of the SOC 11. As illustrated in FIG. 7, the CSDMA engine 48 can save and install contexts by using a dedicated bus (a dedicated path 108) for transferring contexts and the path 114. However, this configuration has a demerit of an increase in the cost of the SOC 11 because there is a need for additionally mounting the dedicated path 108 on the SOC 11.

Figure 8:
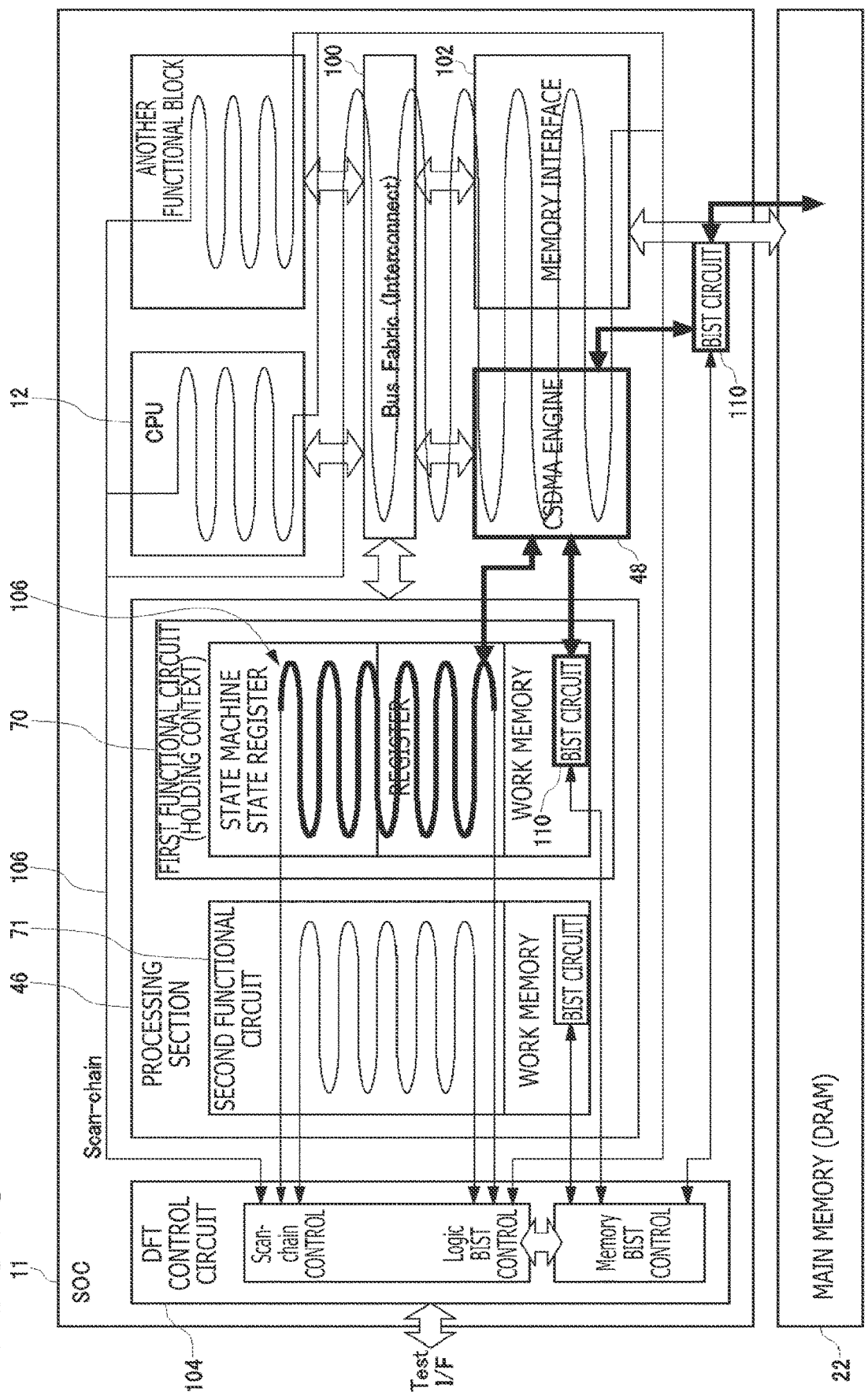
FIG. 8 is a diagram illustrating a configuration of an SOC.

FIG. 8 also illustrates a configuration of the SOC 11. As illustrated in FIG. 8, the CSDMA engine 48 according to the embodiment saves and installs contexts by using a circuit (including the scan chain 106) for DFT and a circuit (a BIST circuit 110) for BIST. For example, the CSDMA engine 48 reads out a context concerning an application having been just executed, from the first functional circuit 70 via the scan chain 106, and stores the read context into the main memory 22 via the BIST circuit 110. In addition, the CSDMA engine 48 reads out a context concerning an application to be subsequently executed, from the main memory 22 via the BIST circuit 110, and installs the read context into the first functional circuit 70 via the scan chain 106.

The scan chain 106 is used in the abovementioned manner. Accordingly, an access can be made to a context in an internal circuit to which software has no access path, so that saving and installation of a context necessary to reproduce a process can be performed. In addition, a context can be transferred at low cost without additionally requiring the bus fabric 100, the dedicated path 108, or the path 114. Moreover, a situation where a normal data transfer being conducted by the SOC 11 is inhibited by a context transfer, can be avoided.

Next, a start timing of context switching will be explained.

The transfer executing section 86 of the CSDMA engine 48 saves a context of an application held in the first functional circuit 70 (the state machine 72 or the like) of the processing section 46, into the main memory 22. An application context that is saved from the processing section 46 into the main memory 22 and an application context that is installed from the main memory 22 into the processing section 46 are data held in the state machine 72 or the like, and include data indicating the current statuses of processes (small-granularity internal processes) that are uncompleted in the processing section 46 at the start time point of context switching.

When an App switch timing is detected, the first functional circuit 70 and the second functional circuit 71 of the processing section 46 immediately stop the respective internal processes, regardless of the states of the internal processes of an application that is in progress. In other words, the first functional circuit 70 and the second functional circuit 71 stop the respective internal processes even if the internal processes are still uncompleted. When an App switch timing is detected, the transfer executing section 86 of the CSDMA engine 48 starts a context transfer, regardless of the states of the internal processes of an application that is in progress. In other words, the transfer executing section 86 starts a context transfer even if the internal processes are still uncompleted.

Figure 9:
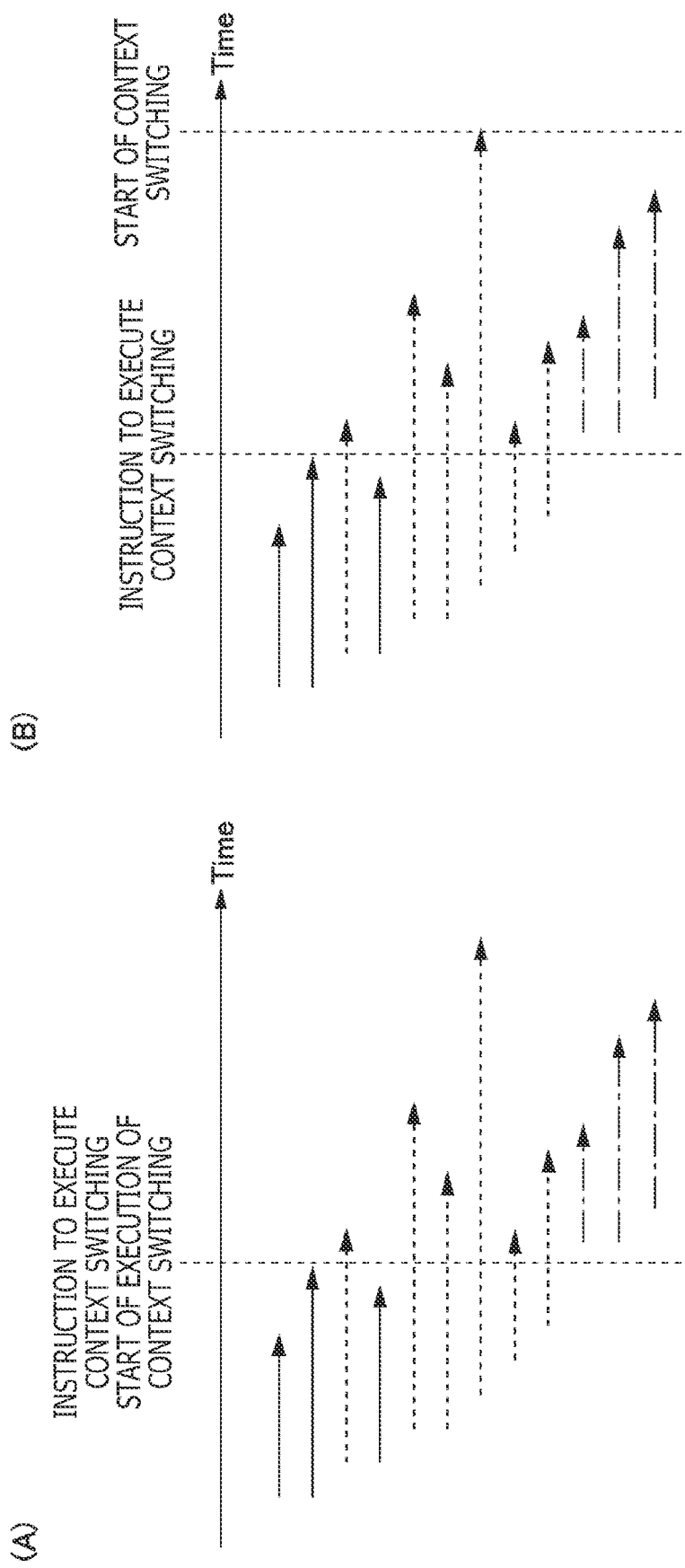
FIG. 9A depicts an example of internal processes when context switching is executed in the first embodiment.
FIG. 9B depicts an example of internal processes when context switching is executed in a modification.

FIG. 9A depicts an example of internal processes when a context switching is executed according to the first embodiment. In FIG. 9A, the horizontal direction indicates a time lapse axis, and each arrow indicates a small-granularity internal process included in a process concerning one application. The left end and the right end of each arrow indicate the start timing of the internal process and the end timing of the internal process, respectively.

As depicted in FIG. 9A, at a time point when the processing section 46 according to the embodiment receives a context switching execution instruction (i.e., a time point when an App switch timing is detected), the processing section 46 immediately stops all the internal processes and starts context switching. In addition, an internal process (broken line in FIG. 9A) that is uncompleted (on the fly/outstanding) at this time point is immediately suspended, and a context at this time point is stored in the main memory 22. It is to be noted that an internal process that is indicated by a dashed line in FIG. 9A is not started because this process is scheduled to be started after reception of a context switching execution instruction. At a time point when the transfer executing section 86 of the CSDMA engine 48 receives a context switching execution instruction (i.e., a time point when an App switch timing is detected), the transfer executing section 86 immediately starts a context transfer (saving and installation).

A context including data (i.e., data held in the state machine 72) that is being internally processed in the processing section 46, that is, data that cannot be confirmed by software, is saved into the SOC 11 according to the embodiment. As a result, an internal process that is in progress at a reception time point of a context switching execution instruction can be restored to the suspended state to be restarted at the next execution time. Therefore, at a reception time point of a context switching execution instruction (a time point when an App switch timing is detected), the SOC 11 according to the embodiment is able to immediately start context switching, whereby a processing delay can be suppressed.

In a certain modification, when an App switch timing is detected, the transfer executing section 86 of the CSDMA engine 48 may wait until the monitoring section 82 confirms completion of an internal process of an application in the processing section 46, and may start a context transfer process after completion of the internal process of the application in the processing section 46 is confirmed.

FIG. 9B depicts an example of internal processes when context switching is executed according to the modification. Also in FIG. 9B, an internal process that is started but is uncompleted (on the fly/outstanding) at a time point of a context switching execution instruction is indicated by a broken line. In the present modification, after an internal process that is started but is uncompleted at a time point of a context switching execution instruction is completed, context switching is started.

Since a process that is started but is uncompleted at a time point of a context switching execution instruction is not suspended but is completed, a process failure (e.g., occurrence of an inconsistency) can be prevented for processing cooperation with the outside of a context switching target block, or for a real-time property. In addition, a data amount of a context to be transferred can be reduced.

Second Embodiment

Regarding the present embodiment, the differences from the abovementioned embodiment will mainly be explained, and an explanation of the same features will be omitted. Each element of the present modification identical to or corresponding to that of the abovementioned embodiment will be explained by being denoted by the same reference sign.

Figure 10:
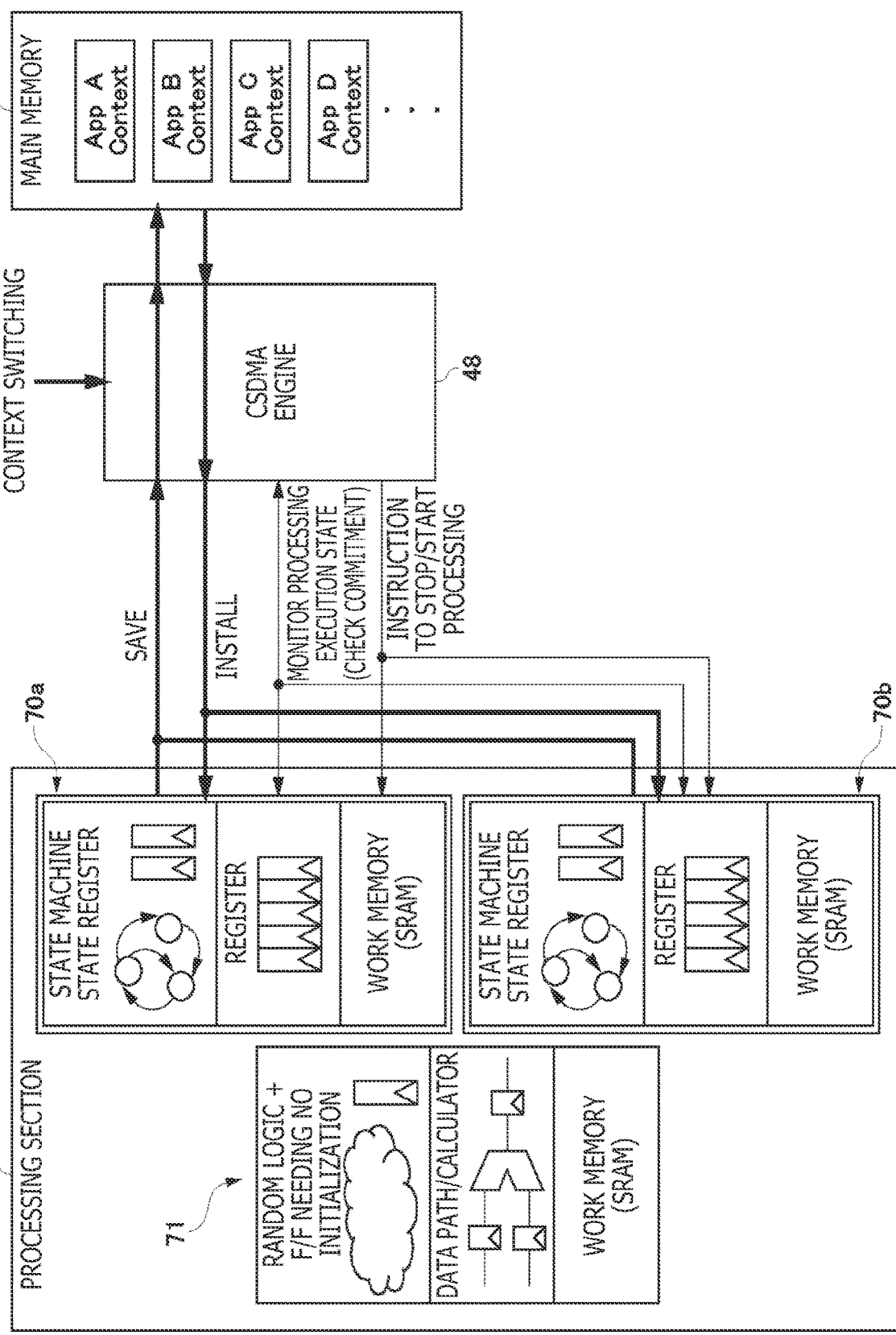
FIG. 10 is a diagram illustrating a configuration of a processing section according to a second embodiment.

FIG. 10 depicts a configuration of the processing section 46 according to the second embodiment. A set of the processing section 46 and the CSDMA engine 48 in FIG. 10 corresponds to the set of the GPU 14 and the CSDMA engine 40 in FIG. 1, the set of the video encoder 16 and the CSDMA engine 42 in FIG. 1, and the set of the video pipeline 18 and the CSDMA engine 44 in FIG. 1. That is, the configuration of the processing section 46 in FIG. 10 is applicable to at least one of the GPU 14, the video encoder 16, and the video pipeline 18. Also, the configuration of the CSDMA engine 48 in FIG. 10 is applicable to at least one of the CSDMA engine 40, the CSDMA engine 42, and the CSDMA engine 44.

The processing section 46 according to the second embodiment includes a plurality of the first functional circuits 70 holding contexts of applications. The processing section 46 includes two first functional circuits 70 (first functional circuit 70a, first functional circuit 70b) in FIG. 10, but may include three or more first functional circuits 70.

While the processing section 46 uses a context of an application held in any one of the first functional circuits 70 to process the application, the transfer executing section 86 of the CSDMA engine 48 according to the second embodiment executes a context transfer of a context of another application held in the other first functional circuit 70.

For example, while the processing section 46 is executing a process of an App A by using a context of the App A held in the first functional circuit 70a, the transfer executing section 86 (1) saves a context of an App D (i.e., App having been executed last) held in the first functional circuit 70b into the main memory 22. Simultaneously, the transfer executing section 86 (2) reads out a context of an App B (i.e., App to be subsequently executed) held in the main memory 22, and installs the context into the first functional circuit 70b.

When an App switch timing is detected while the processing section 46 is executing an application by using a context of the application held in the first functional circuit 70a, the processing section 46 immediately stops the processes of the application. Then, the processing section 46 starts another application by using a context of the other application held in the first functional circuit 70b. As a result, a waiting time period (a time period for waiting for completion of saving and installation of contexts) accompanied by context switching can be reduced to substantially zero.

Third Embodiment

Regarding the present embodiment, the differences from the abovementioned embodiments will mainly be explained, and an explanation of the same features will be omitted. Each element of the present modification identical to or corresponding to that of the abovementioned embodiments will be explained by being denoted by the same reference sign.

A configuration of the processing section 46 according to the third embodiment is identical to that of the processing section 46 according to the second embodiment illustrated in FIG. 10. The processing section 46 executes a process concerning a first application (e.g., App A) by using a context of the first application held in the first functional circuit 70a. Further, the processing section 46 executes a process concerning a second application (e.g., App B) by using a context of the second application held in the first functional circuit 70b.

When an App switch timing is detected, the processing section 46 identifies an application to be subsequently executed, on the basis of pre-setting performed by the management software in the CPU 12, for example. Here, it is assumed that a target to be executed in the processing section 46 is switched from the first application (e.g., App A) to the second application (e.g., App B). The processing section 46 completes a process concerning the first application and being unmixable (in other words, being unable to be executed parallelly or simultaneously) with any process concerning the second application, and then, parallelly executes a process concerning the second application and a process concerning the first application and being mixable with the process concerning the second application.

Figure 11:
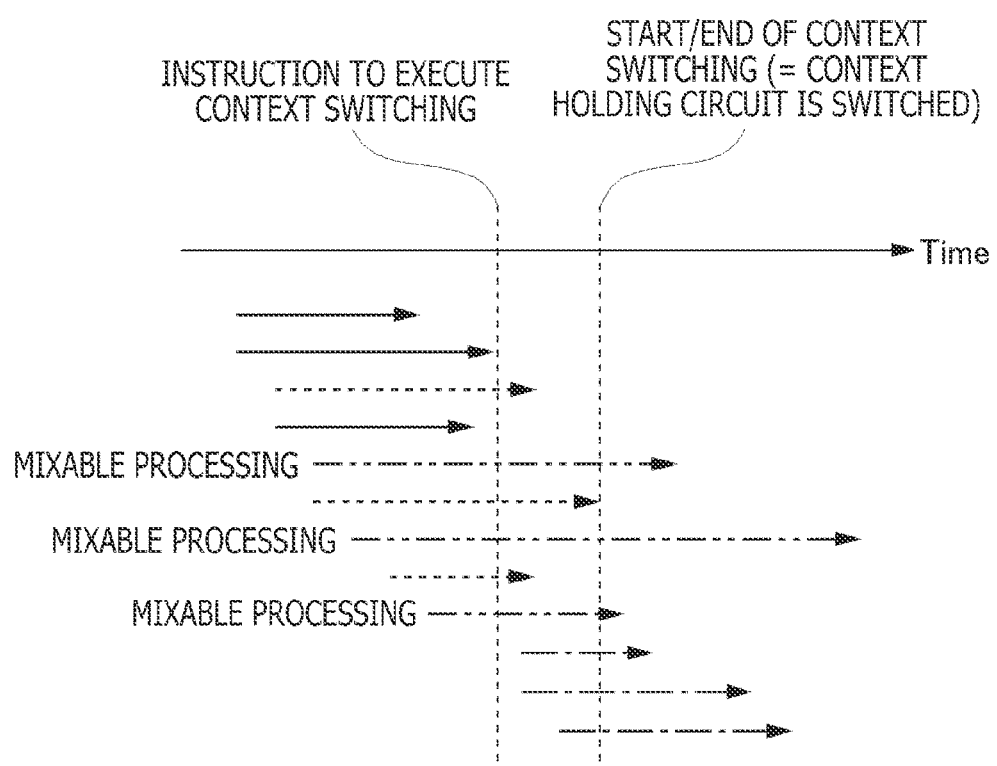
FIG. 11 depicts an example of internal processes when context switching is executed in a third embodiment.

FIG. 11 depicts an example of internal processes when context switching is executed according to the third embodiment. FIG. 11 depicts internal processes of the first application (an application before switching). Broken lines and two-dot chain lines each indicate an internal process that is started but is uncompleted (on-the-fly/outstanding) at a time point of a context switching execution instruction. The broken lines each indicate an internal process that is unmixable with any process concerning the second application, while the two-dot chain lines each indicate an internal process that is mixable with a process concerning the second application.

The mixable processes are internal processes using a data path and a computer, for example. The mixable processes have no dependency on the details of a preceding/following process and have no dependency on the processing details of a function connected as a circuit to the spatial periphery. The mixable processes are internal processes having the above dependencies, for example, and have a possibility of failing when being parallelly executed with a process concerning the second application. The processing section 46 may previously store data indicating whether or not each internal process is mixable with an internal process of any other application. Further, the management software in the CPU 12 may previously store the data into the processing section 46.

After receiving a context switching execution instruction, the processing section 46 still continues on-the-fly/outstanding internal processes concerning the first application. The processing section 46 waits for completion of on-the-fly/outstanding internal processes (indicated by one-dot chain lines in FIG. 11) that are unmixable with the second application (i.e., any other application), and then, starts context switching. In other words, after all the on-the-fly/outstanding internal processes that are mixable with the second application are completed, the processing section 46 starts context switching, irrespective of whether or not processes (indicated by two-dot chain lines in FIG. 11) that are mixable with the second application are completed.

After executing the context switching, the processing section 46 (e.g., the first functional circuit 70a) continuously executes on-the-fly/outstanding internal processes concerning the first application and being mixable with the second application. In parallel with these processes, the processing section 46 (e.g., the first functional circuit 70b) executes internal processes concerning the second application. After all the mixable internal processes are completed, the status of the execution result is recorded in a circuit (e.g., the first functional circuit 70a) holding a context of the first application.

When completion of all the on-the-fly/outstanding internal processes concerning the first application is detected by the monitoring section 82, the transfer executing section 86 of the CSDMA engine 48 saves a context of the first application into the main memory 22 from the circuit (e.g., the first functional circuit 70a) holding the context of the first application. Further, the transfer executing section 86 installs a context of a third application to be subsequently executed in the processing section 46, into the circuit (e.g., the first functional circuit 70a) from the main memory 22.

With the SOC 11 according to the third embodiment, a process concerning the second application can be started at an early time while a failure of a process concerning the first application is prevented. A processing delay in the processing section 46 can be suppressed.

Figure 12:
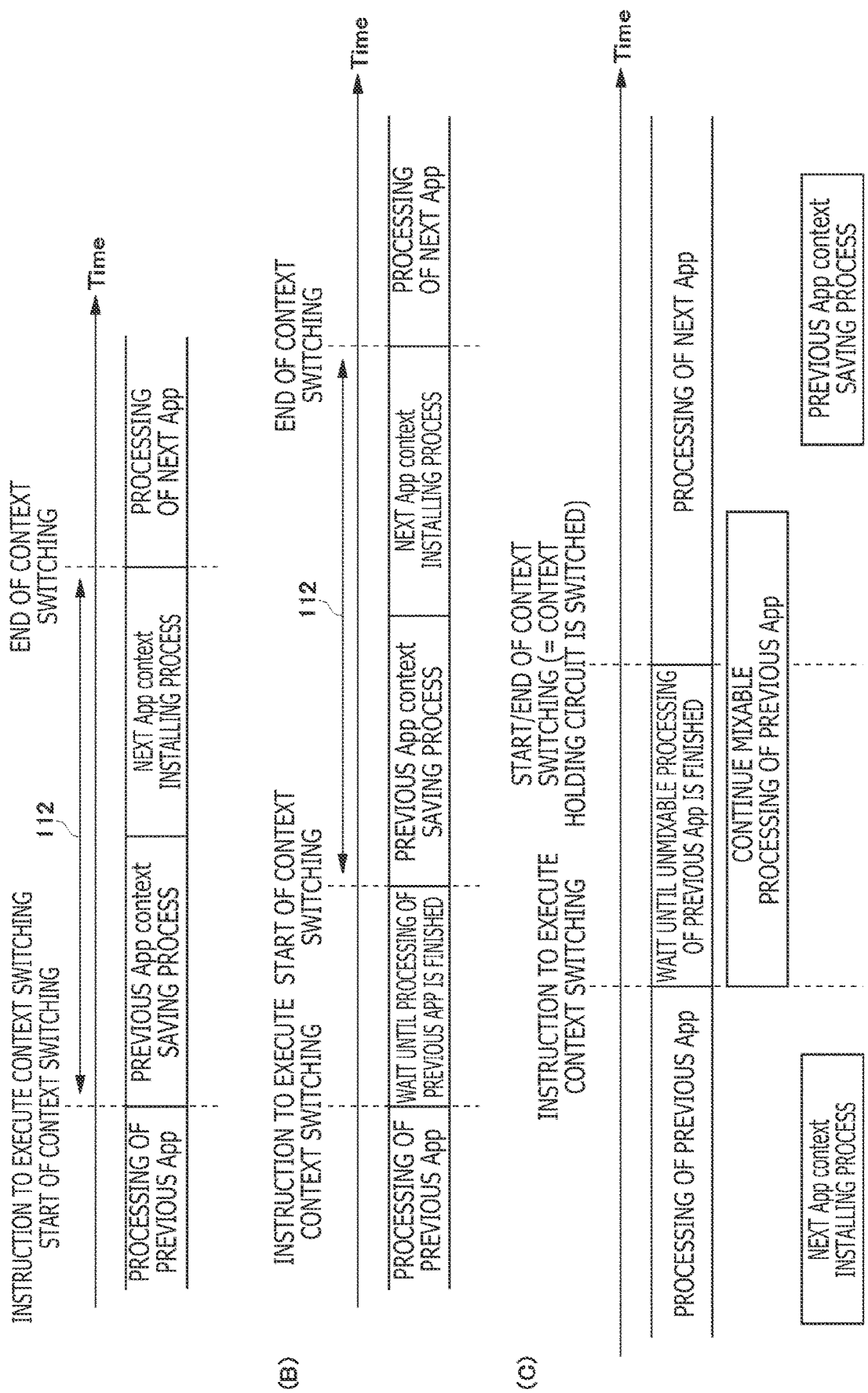
FIGS. 12A, 12B, and 12C each depict operation of the processing section and operation of the CSDMA engine during context switching.

FIGS. 12A, 12B, and 12C each depict operation of the processing section 46 and operation of the CSDMA engine 48 during context switching. FIG. 12A depicts operation of the processing section 46 (immediate context switching) according to the first embodiment. The processing section 46 executes a process of the previous App and a process of the next App, and the CSDMA engine 48 saves a context of the previous App, and installs a context of the next App. FIG. 12B depicts operation (context switching which is performed after completion of all internal processes) of the processing section 46 which has been explained in the modification of the first embodiment. The start of context saving is delayed by a time period during which completion of the previous App process is waited.

In a case where the first functional circuit 70 holding contexts is multiplexed in the manner as explained in the second embodiment, a context of an application to be subsequently executed can previously be installed into one of the context holding circuits by either one of the context switching methods depicted in FIGS. 12A and 12B while an application is being executed with use of the other context holding circuit. As a result, a time period (a time period 112 in FIGS. 12A and 12B) of waiting for completion of saving and installing of contexts can be reduced to substantially zero.

FIG. 12C depicts operation (context switching that is executed after completion of unmixable internal processes) of the processing section 46 according to the third embodiment. The "start/end of context switching" in FIG. 12C indicates switching a reference destination to a different context holding circuit in order to execute the next App. For example, "start/end of context switching" indicates switching of a reference destination from the first functional circuit 70a to the first functional circuit 70b. When mixable internal processes of the previous App are finished, the CSDMA engine 48 saves a context of the previous App into the main memory 22 from the circuit (e.g., the first functional circuit 70a) holding the context of the previous App, in the manner previously explained.

Fourth Embodiment

Regarding the present embodiment, the differences from the abovementioned embodiments will mainly be explained, and an explanation of the same features will be omitted. Each element of the present modification identical to or corresponding to that of the abovementioned embodiments will be explained by being denoted by the same reference sign.

Figure 13:
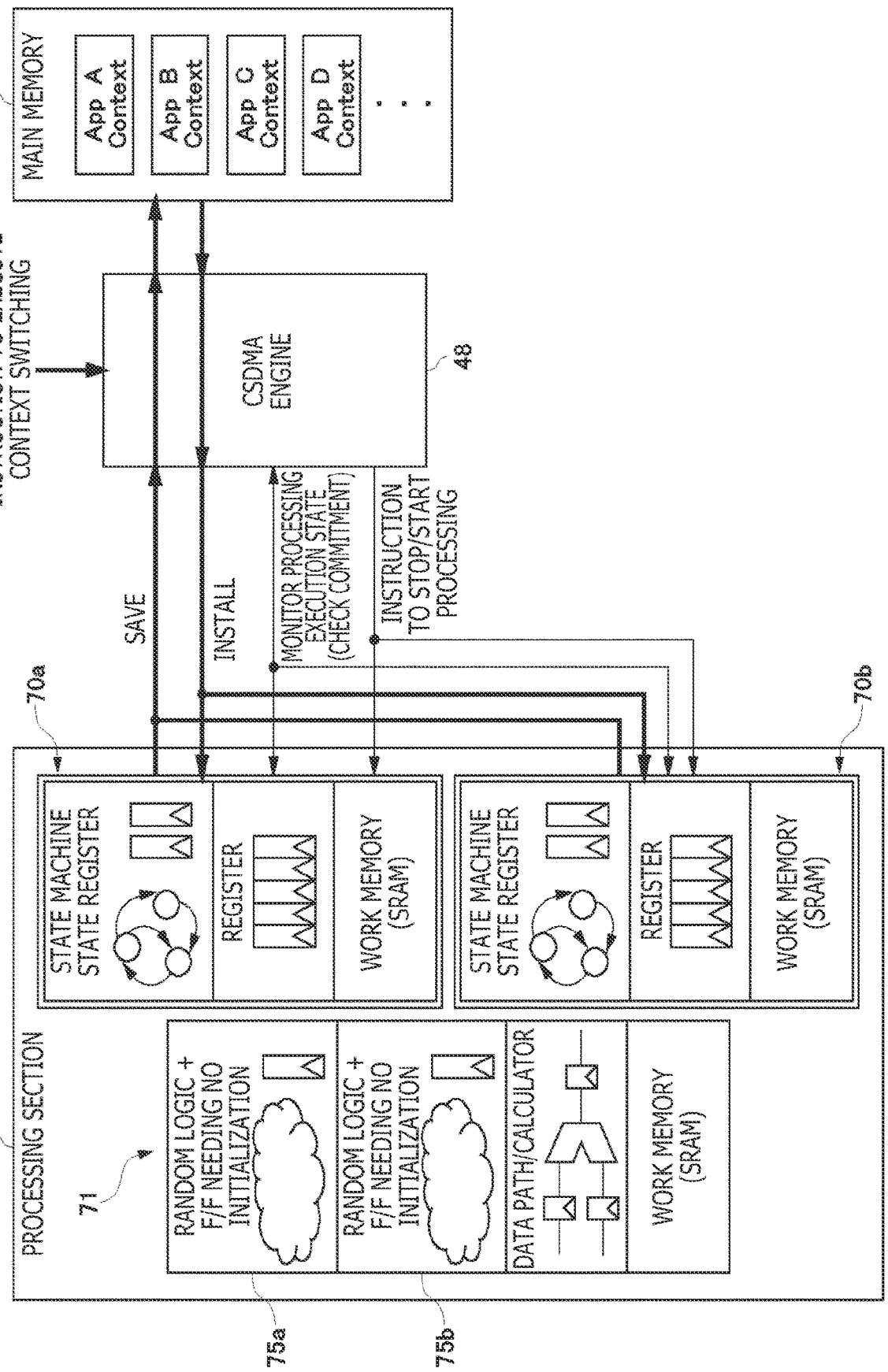
FIG. 13 is a diagram illustrating a configuration of a processing section according to a fourth embodiment.

FIG. 13 illustrates a configuration of the processing section 46 according to the fourth embodiment. The processing section 46 according to the fourth embodiment includes a plurality of functional blocks for executing internal processes that are unmixable among a plurality of applications, in addition to the components of the third embodiment illustrated in FIG. 10. The functional blocks for executing internal processes that are unmixable among a plurality of applications may include (1) a circuit that executes a process having a dependency on "the details of a preceding/following process or the processing details of a function connected as a circuit to the spatial periphery," or (2) a circuit in which, when internal processes of applications based on different settings are inputted, a failure of the internal processes occurs due to the difference in the settings of the applications, for example.

The processing section 46 illustrated in FIG. 13 includes a plurality of random logics 75 which are examples of function blocks for executing internal processes unmixable among a plurality of applications. The processing section 46 includes two random logics 75 (a random logic 75a, a random logic 75b) in FIG. 13, but may include three or more random logics 75.

When a target to be processed in the processing section 46 is switched from the first application (e.g., App A) to the second application (e.g., App B) because an App switch timing is detected, the processing section 46 continuously executes an on-the-fly/outstanding internal process concerning the first application and being unmixable with any process concerning the second application, by using one of the random logics 75 (e.g., the random logic 75a). Further, the processing section 46 immediately starts a process concerning the second application by using the other random logic 75 (e.g., the random logic 75b), without waiting for completion of the unmixable internal processes.

With the SOC 11 according to the fourth embodiment, the necessity to wait for completion of an on-the-fly/outstanding internal process concerning the first application and being unmixable with any process concerning the second application is eliminated. As a result, when a context switching execution instruction is provided, a process concerning the second application can be started at an early time, whereby context switching can be executed at higher speed.

A certain modification of the forth embodiment will be explained. The processing section 46 may simultaneously allocate a plurality of applications to a plurality of multiplexed functional circuits. The processing section 46 may parallely execute internal processes of the plurality of applications. In a case where multiplexed functional circuits are duplexed circuits and four applications (e.g., App A to App D) are targets to be parallelly executed, two selected applications (e.g., App A and App B) may be allocated to the two multiplexed functional circuits. When context switching is executed, the two applications (e.g., App A and App B) having been executed may be replaced with the two remaining applications (e.g., App C and App D) as new targets.

For example, in a case where an internal process of the App A and an internal process of the App B are parallelly executed in the configuration illustrated in FIG. 13, the processing section 46 causes the first functional circuit 70a to hold a context of the App A, and causes the first functional circuit 70b to hold a context of the App B. Further, the processing section 46 may allocate an internal process concerning the App A and being unmixable with any internal process concerning the App B, to the random logic 75a, and may allocate an internal process concerning the App B and being unmixable with any internal process concerning the App A, to the random logic 75b. Alternatively, the processing section 46 may allocate both an internal process concerning the App A and being mixable with any internal process concerning the App B and an internal process concerning the App B and being mixable with any internal process concerning the App A, to the same calculator 76 and the same work memory 77.

According to the configuration of this modification, the processing section 46 executes a plurality of applications simultaneously not in a time division manner, whereby a processing delay can be further suppressed. In addition, the number of times of executing context switching can be suppressed. Moreover, the active rate (or the activation rate) of the circuits included in the processing section 46 can be increased, whereby the performance of data processing can be enhanced.

Fifth Embodiment

Regarding the present embodiment, the differences from the abovementioned embodiments will mainly be explained, and an explanation of the same features will be omitted. Each element of the present modification identical to or corresponding to that of the abovementioned embodiments will be explained by being denoted by the same reference sign.

Figure 14:
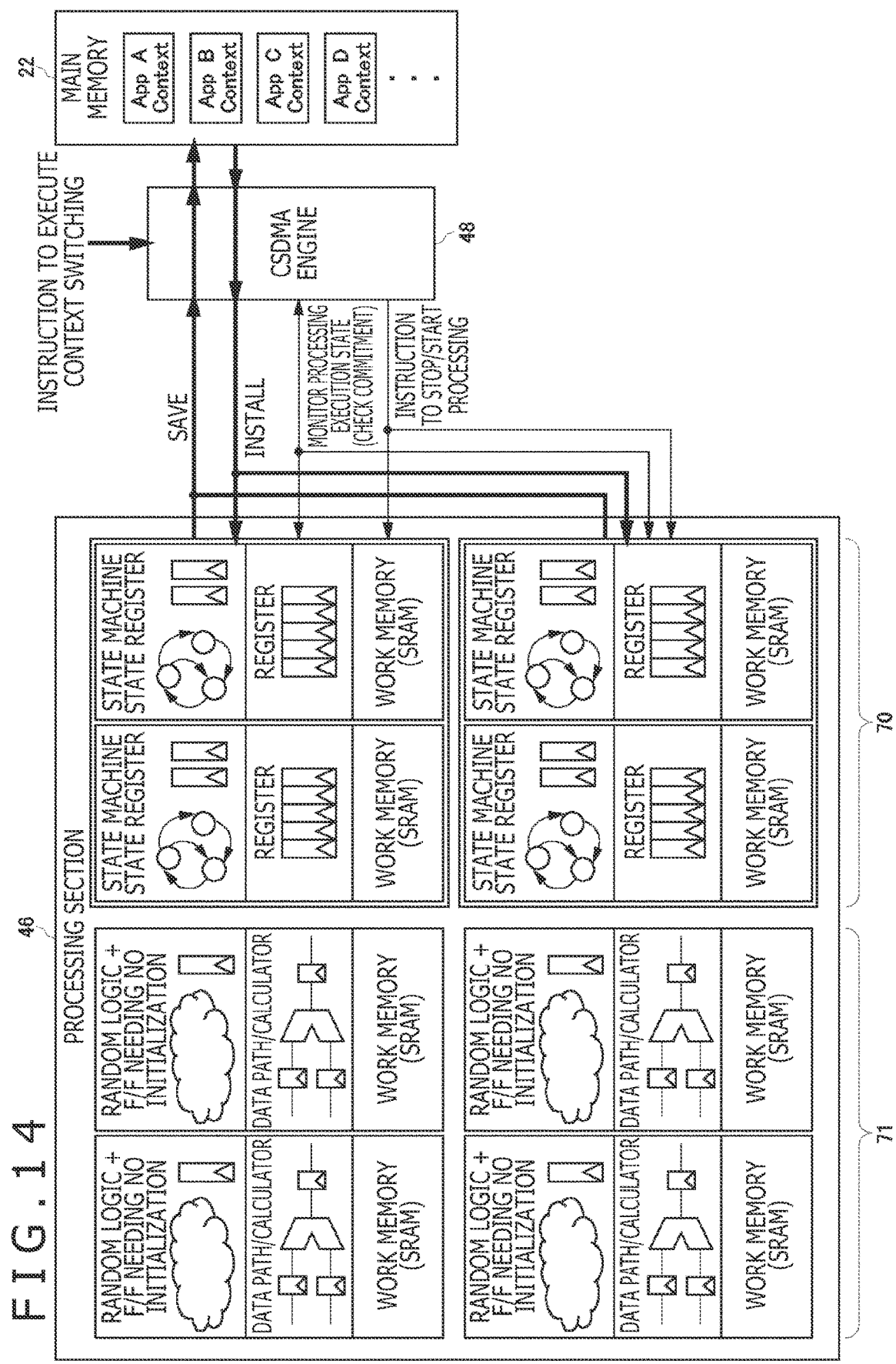
FIG. 14 is a diagram illustrating a configuration of a processing section according to a fifth embodiment.

FIG. 14 depicts a configuration of the processing section 46 according to the fifth embodiment. In the processing section 46 according to the fifth embodiment, each of the first functional circuit 70 holding contexts and the second functional circuit 71 holding no context is multiplexed. The processing section 46 includes four first functional circuits 70 and four second functional circuits 71 in FIG. 14, but a way of multiplexing the first functional circuit 70 and the second functional circuit 71 is not limited to quadplexing.

In the configuration according to the present embodiment, in a case where the performance requirements of applications are different from each other, the processing section 46 decides the number of the first functional circuits 70 and the number of the second functional circuits 71 to be allocated to one application each time context switching is executed. Then, the processing section 46 allocates one or more first functional circuits 70 and one or more second functional circuits 71 to each of applications to be executed. The performance requirement of each application and the number of the first functional circuits 70 and the number of the second functional circuits 71 required by each application may be defined in the processing section 46 through the management software in the CPU 12.

FIGS. 15A and 15B each depict an application allocating example. As depicted in FIG. 15A, the processing section 46 may allocate each of four applications (e.g., App A to App D) to a set of one first functional circuit 70 and one second functional circuit 71. In a case where a performance four times higher than that for data processing concerning the App A is required for data processing concerning an App E, the processing section 46 may allocate four second functional circuits 71 and one first functional circuit 70 to the App E, as depicted in FIG. 15B. When the App E is executed, the remaining three first functional circuits 70 do not need to be used.

The processing section 46 may execute processes based on the allocation depicted in FIG. 15A and processes based on the allocation depicted in FIG. 15B in a time division manner. In this case, the context switching method having been explained in any one of the first to fourth embodiments is applied, whereby a transition between the state in FIG. 15A and the state in FIG. 15B can be made at high speed.

It is to be noted that an interface for sharing information regarding whether or not the multiplexed first functional circuits 70 are currently being operated (whether or not an App a context of which is held is in progress) and information regarding the type of the context (e.g., App identification information) may be provided. In addition, in place of the processing section 46, the CSDMA engine 48 connected to the processing section 46 may integrally control the plurality of first functional circuits 70, and manage which one of the first functional circuits 70 to hold a context of each App.

In addition, to achieve switching between the state in FIG. 15A and the state in FIG. 15B, context switching needs to be performed simultaneously in all the first functional circuits 70. In this case, the context switching method having been explained in any one of the first to fourth embodiments may be performed on each App. Then, after all the Apps are prepared (a timing when internal processes of all the Apps are completed, for example), context switching may be executed. It is to be noted that, to switch only the App A to another App (e.g., App F) during the state in FIG. 15A while the performance requirement of the App F is equal to or lower than that of the App A, context switching may be executed only on the first functional circuits 70 and the second functional circuits 71 corresponding to the App A.

It is to be noted that any application allocating form other than those depicted in FIGS. 15A and 15B may be adopted for the first functional circuits 70 and the second functional circuits 71. For example, in the processing section 46, an application occupying two or three second functional circuits 71 may be executed simultaneously with another application.

In the abovementioned second to fifth embodiments, the first functional circuit 70 holding contexts are multiplexed. In this configuration, saving and installation of contexts can be performed by overlapping with a process of an application. As a result, the transfer capabilities of the CSDMA engine 48 and the line (for example, the bus fabric 100, the scan chain 106, the dedicated path 108, and the path 114) for inputting/outputting data can be simplified.

For example, it is assumed that, when applications are sequentially operated at an interval of 1/240 second (=time period 4.2 milliseconds) in the video rendering process depicted in FIG. 3, a vertical blanking interval and a processing time period of each application are 0.5 millisecond and 3.7 milliseconds, respectively. In this case, context switching needs to be executed within a time period shorter than 0.5 millisecond in a configuration in which the functional circuit is not multiplexed. On the other hand, it is sufficient if context switching is executed within a time period shorter than 3.7 milliseconds in a configuration in which the functional circuit is multiplexed. Further, if a context data amount is 50 MB, a transfer capability of at least 100 GB/second is required to perform a transfer within a vertical blanking interval. On the other hand, a transfer capability of at least 13.5 GB/second is sufficient to perform a transfer within an application process time period.

The present disclosure has been explained so far on the basis of the first to fifth embodiments. These embodiments are just examples. A person skilled in the art should understand that combination of the constituent elements or the processing steps can be modified in various ways and that the resultant modifications are also encompassed by the present disclosure.

In the above embodiments, contexts are saved into the main memory 22. However, a memory (or a context holding memory) serving as a context saving destination may be a memory separate from the main memory 22. In addition, a data holding characteristic of the memory as a context saving destination may be volatile or may be nonvolatile.

In a case where a context saving destination is a nonvolatile memory, even when a power supply to the memory is interrupted during a temporary halt/restart such as a suspension or hibernation of the processing section 46, contexts saved in the memory can be held. Accordingly, high-speed context switching according to any one of the above embodiments can be more effectively used.

In the SOC 11, in a case where a power supply to the processing section 46 that is not being used is independently interrupted in order to reduce power consumption, a breakpoint at which a process is completed needs to be waited, or practical use cannot be achieved due to a long period of time of context saving and installation. When the high-speed context switching according to any one of the embodiments is adopted, intermittent operation can be performed to reduce power consumption. Accordingly, the power efficiency can be increased.

In addition, in the above embodiments, the CPU 12, the processing section 46 (the GPU 14, the video encoder 16, and the like), and the CSDMA engine 48 are mounted on one piece of hardware (the SOC 11). In a certain modification, these functional blocks may dispersedly be mounted on a plurality of pieces of hardware. For example, the CSDMA engine 48 according to any one of the embodiments may be implemented as a data transfer device that is independent from a device on which the processing section 46 is mounted.

FIG. 16 is a flow diagram illustrating a context switching method that may be carried out by a computing apparatus. In a first step 1601, a switching timing is detected of an application to be executed in a processing section that executes processes concerning a plurality of applications in a time division manner. In another step, a transfer process is executed, when the switching timing is detected, to save a context of an application that is in progress in the processing section into a memory from the processing section. In addition, another step 1603 may include installing a context of an application to be subsequently executed in the processing section into the processing section from the memory, not through a process by software managing the plurality of applications.

Any combination of the abovementioned embodiments and modifications also takes effect as an embodiment of the present disclosure. A new embodiment obtained by such a combination provides all the effects of the combined embodiments and modifications. In addition, a person skilled in the art should understood that the functions to be implemented by the constituent features set forth in the claims are achieved by any one of the constituent features explained in the embodiments and modifications, or by cooperation of these constituent features.

INDUSTRIAL APPLICABILITY

The technology disclosed herein is applicable to a system or device that processes data.

REFERENCE SIGNS LIST

10: Computer
11: SOC
46: Processing section
48: CSDMA engine
80: Detection section
86: Transfer executing section
106: Scan chain

The invention claimed is:

1. A data processing system comprising:
a processing section that executes processes concerning a plurality of applications in a time division manner; and
a data transfer section that executes a data transfer between the processing section and a memory, wherein
the data transfer section includes:
a detection section that detects a switching timing of an application to be executed in the processing section, and
a transfer executing section that executes, when the switching timing is detected, a transfer process to save a context of an application that is in progress in the processing section into the memory from the processing section, and to install a context of an application to be subsequently executed in the processing section into the processing section from the memory, not through a process by software managing the plurality of applications, wherein
the processing section includes a plurality of functional sections that hold contexts of applications,
the processing section uses a context of a first application held in a first functional section to execute a process concerning the first application, and uses a context of a second application held in a second functional section to execute a process concerning the second application, and
in a case where an application to be executed in the processing section is switched from the first application to the second application, the processing section completes a process concerning the first application and being unmixable with any process concerning the second application, and then, parallelly executes a process concerning the second application and a process concerning the first application and being mixable with the process concerning the second application.

2. The data processing system according to claim 1, wherein
a context of an application to be saved into the memory includes a current state of a process that is uncompleted in the processing section, and when the switching timing is detected, the transfer executing section executes the transfer process even if a process concerning an application is uncompleted in the processing section.

3. The data processing system according to claim 1, wherein, when the switching timing is detected, the transfer executing section executes the transfer process after a process concerning an application is completed in the processing section.

4. The data processing system according to claim 3, wherein
a process concerning an application and executed in the processing section includes a plurality of small-granularity internal processes of the application, and
the transfer executing section executes the transfer process after the internal processes of the application to be executed in the processing section is completed.

5. The data processing system according to claim 1, wherein
the processing section reads out a command from a plurality of queues that correspond to the plurality of applications and in which commands for designating details of the processes concerning the respective applications are accumulated, and
when an application to be executed is changed, the processing section changes a queue from which a command is read out.

6. The data processing system according to claim 1, wherein the detection section detects, as the switching timing, a start of a vertical blanking interval or a start of a horizontal blanking interval.

7. The data processing system according to claim 1, wherein the transfer executing section executes the transfer process by using at least either a scan chain for design for test or a circuit for a memory built in self-test.

8. The data processing system according to claim 1, wherein
the processing section includes a plurality of functional sections that hold contexts of applications, and
while the processing section uses a context of an application held in a first functional section to execute a process concerning the application, the transfer executing section executes the transfer process on a context of another application held in a second functional section in the processing section.

9. The data processing system according to claim 1, wherein a target of the transfer process by the transfer executing section includes a context held in a state machine of the processing section.

10. The data processing system according to claim 1, wherein a target of the transfer process by the transfer executing section includes a context that is held in the processing section but is not accessible to software.

11. The data processing system according to claim 1, wherein the context is data necessary to reproduce a suspended process of the corresponding application.

12. A data transfer device comprising:
a detection section that detects a switching timing of an application to be executed in a processing section that executes processes concerning a plurality of applications in a time division manner; and
a transfer executing section that executes, when the switching timing is detected, a transfer process to save a context of an application that is in progress in the processing section into a memory from the processing section, and to install a context of an application to be subsequently executed in the processing section into the processing section from the memory, not through a process by software managing the plurality of applications, wherein the processing section includes a plurality of functional sections that hold contexts of applications, the processing section uses a context of a first application held in a first functional section to execute a process concerning the first application, and uses a context of a second application held in a second functional section to execute a process concerning the second application, and in a case where an application to be executed in the processing section is switched from the first application to the second application, the processing section completes a process concerning the first application and being unmixable with any process concerning the second application, and then, parallelly executes a process concerning the second application and a process concerning the first application and being mixable with the process concerning the second application.

13. A context switching method comprising:

by a computer, detecting a switching timing of an application to be executed in a processing section that executes processes concerning a plurality of applications in a time division manner; and executing, when the switching timing is detected, a transfer process to save a context of an application that is in progress in the processing section into a memory from the processing section, and to install a context of an application to be subsequently executed in the processing section into the processing section from the memory, not through a process by software managing the plurality of applications, wherein the processing section includes a plurality of functional sections that hold contexts of applications, the processing section uses a context of a first application held in a first functional section to execute a process concerning the first application, and uses a context of a second application held in a second functional section to execute a process concerning the second application, and in a case where an application to be executed in the processing section is switched from the first application to the second application, the processing section completes a process concerning the first application and being unmixable with any process concerning the second application, and then, parallelly executes a process concerning the second application and a process concerning the first application and being mixable with the process concerning the second application.

* * * * *